(12) United States Patent
Yamamoto et al.

(10) Patent No.: US 8,401,313 B2
(45) Date of Patent: Mar. 19, 2013

(54) IMAGE PROCESSING APPARATUS AND IMAGE PROCESSING METHOD

(75) Inventors: Takahisa Yamamoto, Kawasaki (JP); Masami Kato, Sagamihara (JP); Yoshinori Ito, Tokyo (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1145 days.

(21) Appl. No.: 12/262,052

(22) Filed: Oct. 30, 2008

(65) Prior Publication Data

US 2009/0116693 A1    May 7, 2009

(30) Foreign Application Priority Data

Nov. 1, 2007   (JP) ................................. 2007-285403

(51) Int. Cl.
*G06K 9/68* (2006.01)
*G06K 9/70* (2006.01)

(52) U.S. Cl. .......................... 382/226; 382/156; 382/159

(58) Field of Classification Search .................. 382/103, 382/118, 159, 226, 156
See application file for complete search history.

(56) References Cited

U.S. PATENT DOCUMENTS

| 7,379,568 | B2 * | 5/2008 | Movellan et al. | 382/118 |
| 7,574,037 | B2 * | 8/2009 | Hidai et al. | 382/159 |
| 7,769,228 | B2 * | 8/2010 | Bahlmann et al. | 382/155 |
| 7,844,108 | B2 * | 11/2010 | Sabe et al. | 382/159 |
| 7,876,965 | B2 * | 1/2011 | Ai et al. | 382/226 |
| 2005/0213810 | A1 | 9/2005 | Sabe et al. | |
| 2008/0063285 | A1 * | 3/2008 | Porikli et al. | 382/190 |
| 2009/0116693 | A1 * | 5/2009 | Yamamoto et al. | 382/103 |

FOREIGN PATENT DOCUMENTS

JP    2005-284487 A    10/2005

OTHER PUBLICATIONS

P. Viola and M. Jones, "Rapid Object Detection using a Boosted Cascade of Simple Features" (Proc. IEEE Conf. on Computer Vision and Pattern Recognition, vol. 1, pp. 511-518, Dec. 2001).
B. Wu, H. Ai, C. Huang, and S. Lao, "Fast Rotation Invariant Multi-View Face Detection Based on Real AdaBoost," (Proc. Sixth Int'l Conf. Automatic Face and Gesture Recognition, pp. 79-84, 2004).
M. Jones and P. Viola, "Fast Multi-View Face Detection," (Mitsubishi Electric Research Laboratories TR2003-96, Jul. 2003).
C. Huang, H.Z. Ai, Y. Li, and S.H. Lao, "Vector Boosting for Rotation Invariant Multi-View Face Detection," (Proc. 10th IEEE Int'l Conf. Computer Vision, 2005).

* cited by examiner

*Primary Examiner* — Gregory M Desire
(74) *Attorney, Agent, or Firm* — Carter, DeLuca, Farrell & Schmidt LLP

(57) ABSTRACT

An image processing method is provided for an image processing apparatus which executes processing by allocating a plurality of weak discriminators to form a tree structure having branches corresponding to types of objects so as to detect objects included in image data. Each weak discriminator calculates a feature amount to be used in a calculation of an evaluation value of the image data, and discriminates whether or not the object is included in the image data by using the evaluation value. The weak discriminator allocated to a branch point in the tree structure further selects a branch destination using at least some of the feature amounts calculated by weak discriminators included in each branch destination.

12 Claims, 14 Drawing Sheets

IMAGE PROCESSING APPARATUS AND IMAGE PROCESSING METHOD

BACKGROUND OF THE INVENTION

1. Field of the Invention

The present invention relates to an image processing apparatus for processing image data using weak discriminators allocated in a tree structure.

2. Description of the Related Art

In recent years, along with the progress of statistical learning methods, as an image processing method for detecting a target object in image data, various practical methods have been proposed. In particular, in case of face detection processing having a human face part as a target object, various applications of the detection result are possible. Hence, researches and developments have particularly been made.

For example, P. Viola and M. Jones, "Rapid Object Detection using a Boosted Cascade of Simple Features" (Proc. IEEE Conf. on Computer Vision and Pattern Recognition, Vol. 1, pp. 511-518, December 2001) (to be referred to as reference 1 hereinafter) proposes a method of implementing front-view face detection by selecting very simple feature amounts called rectangular features using ensemble learning such as AdaBoost or the like, and combining these features. According to reference 1, since processing for aborting detection processing for an object which is obviously not a face during detection is adopted, high-speed face detection processing is implemented.

Furthermore, various proposals have been made about face detection for views in arbitrary directions (face detection of a plurality of types) in addition to a front view. For example, B. Wu, H. Ai, C. Huang, and S. Lao, "Fast Rotation Invariant Multi-View Face Detection Based on Real AdaBoost," (Proc. Sixth Int'l Conf. Automatic Face and Gesture Recognition, pp. 79-84, 2004) (to be referred to as reference 2 hereinafter) discloses a method that configures multi-view face detectors.

Moreover, M. Jones and P. Viola, "Fast Multi-View Face Detection," (Mitsubishi Electric Research Laboratories TR2003-96, July 2003) (to be referred to as reference 3 hereinafter) discloses an arrangement which comprises an identifier that identifies a face view, and detectors that execute face detection to have specific face views as targets. According to this reference, a face view is determined first using the identifier to select the detectors having the determined face view as a target, and face detection is executed using the selected detectors, thus implementing face detection processing for views in arbitrary directions.

In addition, C. Huang, H. Z. Ai, Y. Li, and S. H. Lao, "Vector Boosting for Rotation Invariant Multi-View Face Detection," (Proc. 10th IEEE Int'l Conf. Computer Vision, 2005) (to be referred to as reference 4 hereinafter) and Japanese Patent Laid-Open No. 2005-284487 implement face detection for views in arbitrary directions by adopting a structure (tree structure) in which detectors capable of detecting faces of views in all directions are allocated to start processing from these detectors before a branch point to detectors for specific face views.

However, Japanese Patent Laid-Open No. 2005-284487 and references 2 to 4, which implement face detection for views in arbitrary directions (face detection of a plurality of types), respectively suffer the following problems in association with the processing speed of face detection.

For example, in case of Japanese Patent Laid-Open No. 2005-284487, upon selecting a branch destination at a branch node of the tree structure, branch destinations are selected in turn. More specifically, when a leaf node (terminal node) is reached in a given branch destination, image data to be processed is determined as a "face of a view in a direction handled by the branch destination of interest", and the detection processing for that image data ends. On the other hand, when processing is aborted in one branch destination during detection, the control returns to the branch node to select other branch destinations in turn.

In this manner, the branch node does not select the branch destinations based on a reference of some sort, but it executes processing according to a labeling order of branch destinations.

For this reason, upon detecting a face of a view in a direction handled by a branch destination which has a later labeling order of processing, selection of branch destinations fails many times until that branch destination is selected (the processing is aborted in branch destinations many times during detection). As a result, huge amounts of processing time are required until a leaf node of that branch destination is reached.

On the other hand, reference 2 adopts an arrangement in which face detection of views in arbitrary directions is executed using a plurality of detectors prepared for respective face views. As the sequence of face detection at this time, all the detectors execute processes a little to estimate certainty factors of all the detectors, and the detectors are selected based on the magnitudes of the estimated certainty factors. After that, the selected detectors execute the remaining processes to attain face/non-face discrimination.

Therefore, in case of reference 2, since not all the detectors are always operated, and only specific detectors are operated, the processing time can be shortened.

However, in case of reference 2, every time a detection sub-window is scanned in image data to be processed, the certainty factors of all the detectors are required to be estimated. In general, since no face is detected from most of regions in image data, it is not efficient to estimate the certainty factors of all the detectors even for these regions.

In case of reference 3, prior to processing of the detectors having a specific face view as a target, the identifier that identifies a face view needs to be activated in advance. For this purpose, a processing time required to activate the identifier that identifies a face view needs to be assured. As in the case of reference 2, every time a detection sub-window is scanned in image data to be processed, the identifier that identifies a face view needs to be activated, resulting in poor efficiency.

Furthermore, in case of reference 4, a framework called Vector Boosting is formulated as the sequence for selecting a branch destination at a branch node of the tree structure. According to this framework, a degree of confidence, which is normally calculated as a scalar value, is calculated as a vector value including elements corresponding to branch destinations, thereby determining a branch destination (a direction in which values of respective elements of a vector exceed a threshold is determined as a branch direction).

However, in case of this method, the computation volume upon detection becomes huge compared to detectors using normal AdaBoost. That is, since a value which is normally calculated as a scalar value, is calculated as a vector value, the computation volume increases by the number of dimensions of that vector.

In case of reference 4 as well, every time a detection sub-window is scanned in image data to be processed, selection processing based on Vector Boosting needs to be executed. For this reason, the selection processing is executed even for regions where no face is detected as in references 2 and 3, resulting in poor efficiency.

As described above, Japanese Patent Laid-Open No. 2005-284487 and references 2 to 4, which can execute face detection of views in arbitrary directions, suffer the following problems.

One, an overhead is large in processes until detectors corresponding to a face view are selected.

And two, the number of times of execution of processing for selecting detectors corresponding to a face view is large.

For this reason, upon detection of target objects of a plurality of types in image data, it is demanded to overcome such problems, and to improve the processing speed.

SUMMARY OF THE INVENTION

An image processing apparatus according to the present invention executes processing by allocating a plurality of weak discriminators to form a tree structure having branches corresponding to types of objects so as to detect objects included in image data. Each weak discriminator includes a calculation unit configured to calculate a feature amount to be used in a calculation of an evaluation value of the image data; and a discrimination unit configured to discriminate whether or not the object is included in the image data by using the evaluation value. Further, the weak discriminator allocated to a branch point in the tree structure further includes a selection unit configured to select a branch destination using at least some of the feature amounts calculated by weak discriminators included in each branch destination.

According to the present invention, objects of a plurality of types in image data can be detected at high speed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings. Note that the following embodiments will explain an image processing apparatus in which weak discriminators are allocated in a tree structure, so that processing starts from weak discriminators which have a processing target as a target to processed, and gradually branches to weak discriminators which have only specific target objects as processing targets.

First Embodiment

1. Hardware Arrangement of Image Processing Apparatus

Figure 1:
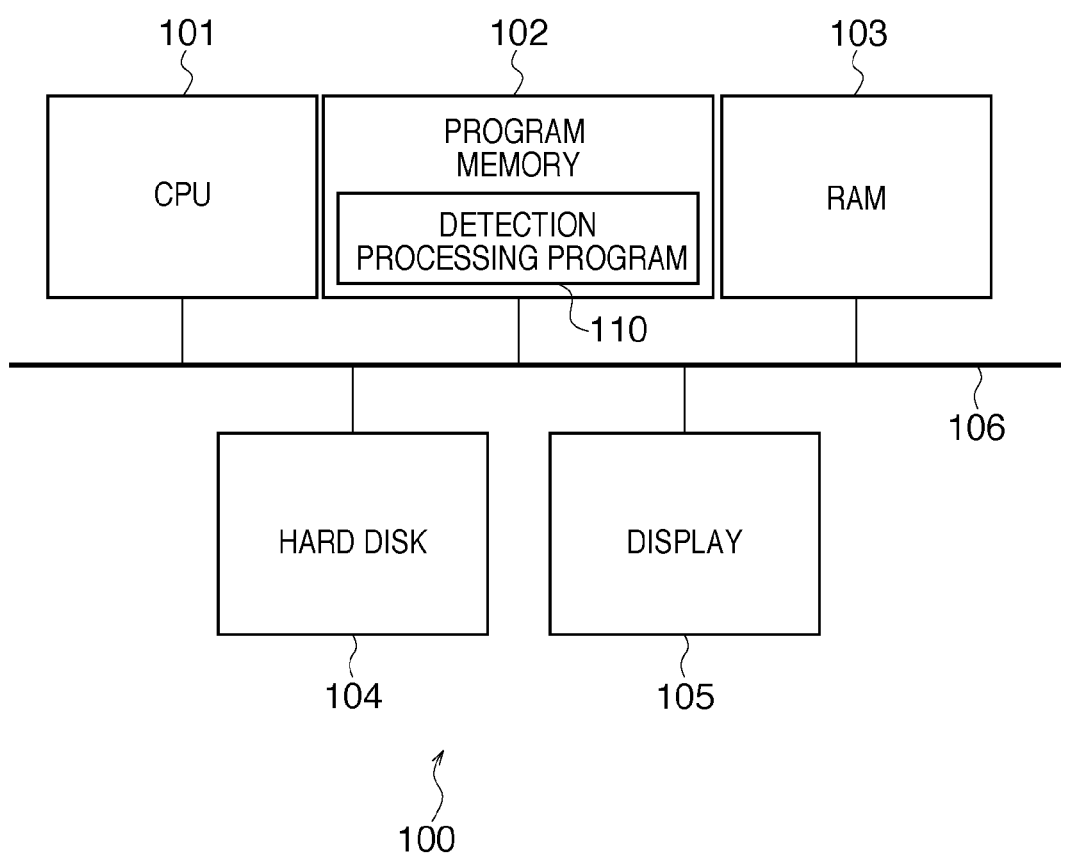
FIG. 1 is a block diagram showing the hardware arrangement of an image processing apparatus according to the first embodiment of the present invention.

FIG. 1 is a block diagram showing the hardware arrangement of an image processing apparatus 100 according to the first embodiment of the present invention. Referring to FIG. 1, reference numeral 101 denotes a CPU (central processing unit) which executes processing according to a detection processing program 110 required to implement an image processing method to be described later.

Reference numeral 102 denotes a program memory which stores the detection processing program 110 to be executed by the CPU 101. Reference numeral 103 denotes a RAM which provides a memory used to temporarily store various kinds of information when the CPU 101 executes the detection processing program 110.

Reference numeral 104 denotes a hard disk, which is a storage medium used to save image data, parameters of weak discriminators, and the like. Reference numeral 105 denotes a display, which displays the processing result of the detection processing program 110 to the user. Reference numeral 106 denotes a control bus/data bus which connects these units 102 to 105 and the CPU 101.

Using hardware with the above arrangement, an image processing method according to the present embodiment can be executed.

Note that the image processing apparatus 100 implements the image processing method according to the present embodiment by the processes of the CPU 101. However, the present embodiment is not limited to this, and the image processing method may be implemented by replacing some of the processes by the CPU 101 by dedicated hardware components.

2. Module Configuration of Detection Processing Program

Figure 2:
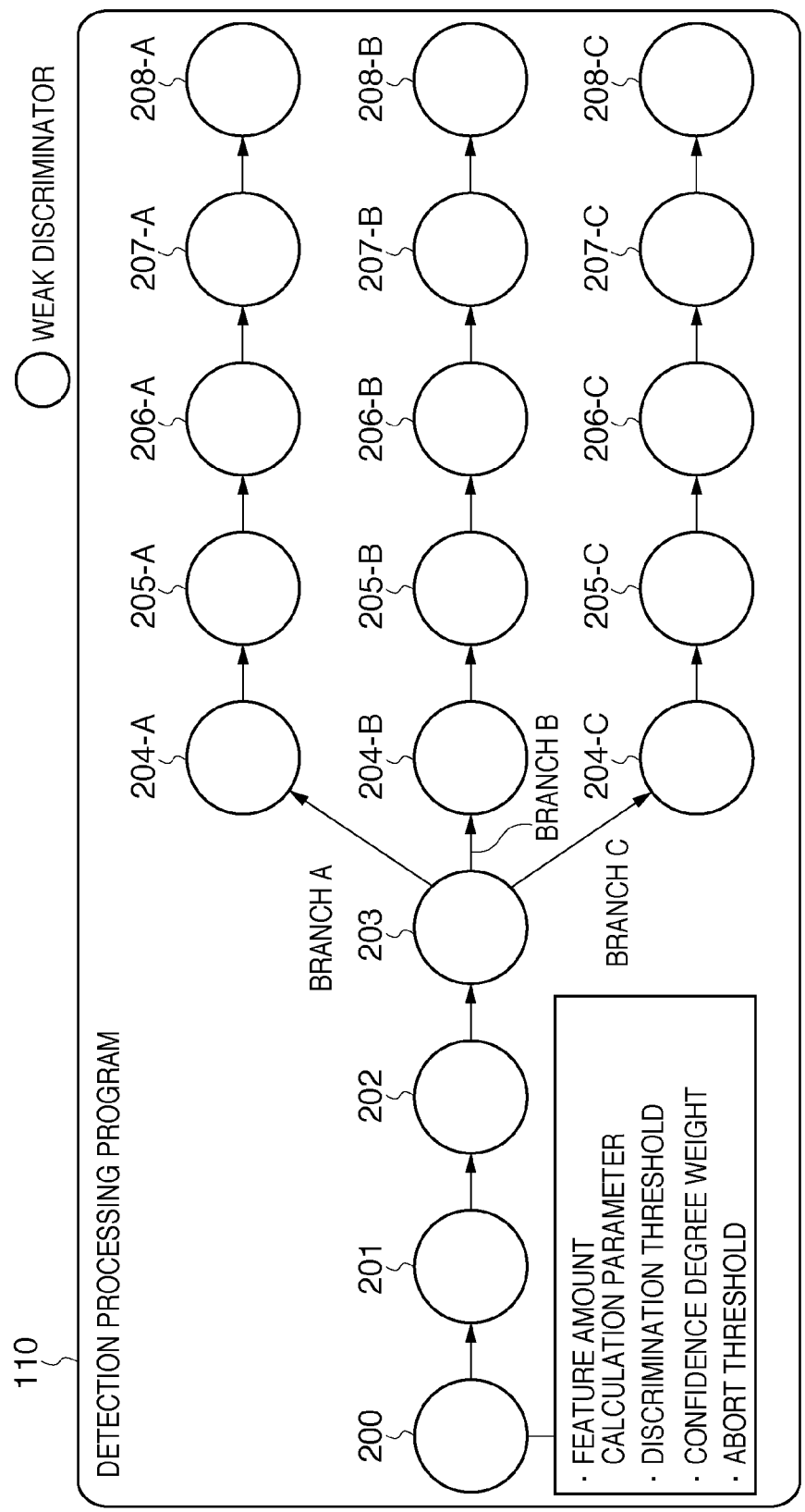
FIG. 2 is a view showing the module configuration of a detection processing program.

FIG. 2 is a view showing the module configuration of the detection processing program 110. As shown in FIG. 2, the detection processing program 110 has a configuration in which weak discriminators as modules are allocated to form a tree structure having the number of branches corresponding to the types of target objects.

Note that a target object to be detected upon execution of the detection processing program 110 is not particularly limited. However, in this embodiment and subsequent embodiments, a human face part will be explained as a target object.

The detection processing program 110 outputs a face part as a target object while categorizing it into three types, that is, a right view (category 1), front view (category 2), and left view (category 3).

That is, the tree structure of weak discriminators in the detection processing program 110 starts from a weak discriminator which has objects of all types as a processing target, and gradually branches to weak discriminators each of which has a target object of a specific type (one of front view, right view, and left view) as a processing target.

In the detection processing program 110, weak discriminators 200 to 203 are those which have target objects of all types (front-, right-, and left-view faces) as a processing target.

Weak discriminators 204-A to 208-A are those which have a target object of category 1 (right-view face) as a processing target.

Weak discriminators 204-B to 208-B are those which have a target object of category 2 (front-view face) as a processing target.

Weak discriminators 204-C to 208-C are those which have a target object of category 3 (left-view face) as a processing target.

In each weak discriminator, as parameters for specifying that weak discriminator, "feature amount calculation parameters", a "discrimination threshold", "confidence degree weight", and "abort threshold" are determined, and each weak discriminator executes processing using these parameters (details of the processing will be described later). FIG. 2 describes only the parameters for the weak discriminator 200, and does not show any parameters for other weak discriminator. However, in practice, assume that parameters are determined for all weak discriminators.

3. Sequence of Processing in Detection Processing Program

The sequence of processing in the detection processing program 110 will be described below with reference to FIG. 3. Upon starting execution of the detection processing program 110 in step S300, the program 110 reads out image data included in a processing window of image data to be processed in step S301.

Figure 6:
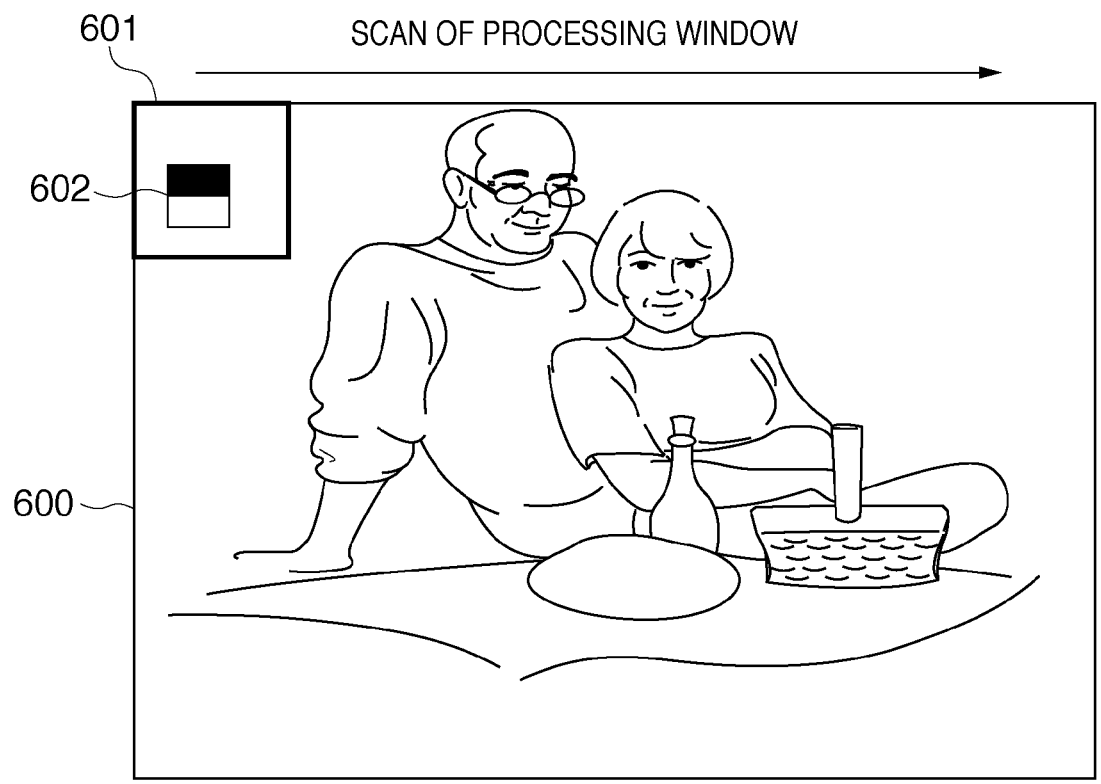
FIG. 6 is a view showing an example of image data to be processed.

FIG. 6 shows an example of image data 600 to be processed. As shown in FIG. 6, when the detection processing program 110 processes the image data 600, it scans a processing window 601, and reads out image data included in the processing window 601 at each scan destination, thus executing processing for each readout image data.

Figure 3:
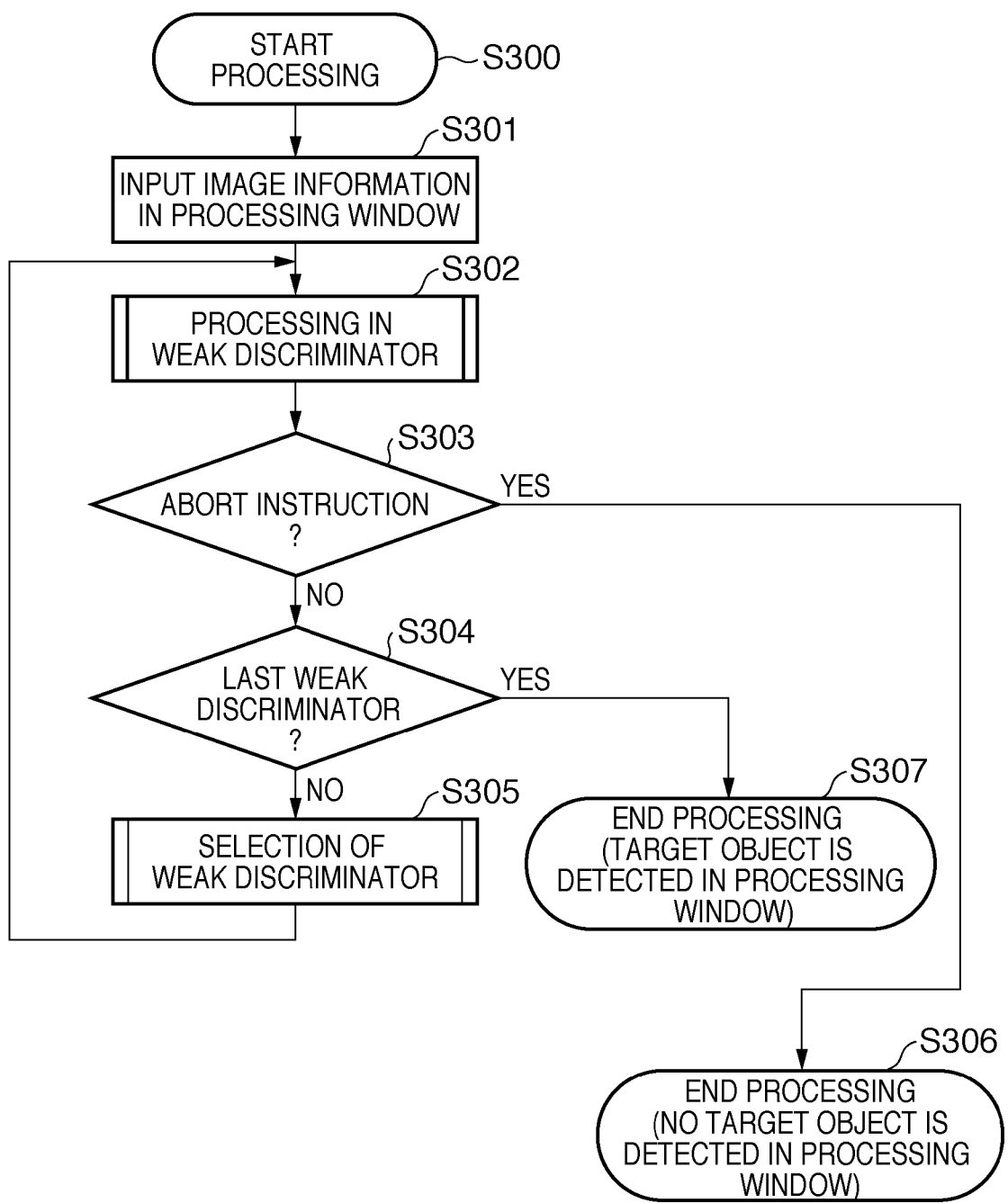
FIG. 3 is a flowchart showing the sequence of processing in the detection processing program.

The description will revert to FIG. 3. In step S302, the program 110 inputs the image data in the processing window 601 to a weak discriminator to execute specified processing (details of processing executed in each weak discriminator will be described later with reference to FIG. 4).

The program 110 checks in step S303 if an abort instruction was issued in the processing of the weak discriminator executed in step S302 (the abort instruction will be described together in the description of the flowchart of FIG. 4).

If the program 110 determines in step S303 that the abort instruction was issued, the process advances to step S306, and the processing of the detection processing program 110 at the current position of the processing window 601 ends. In this case, at the current position of the processing window 601, the program 110 determines that a target object to be detected is not detected in a branch destination where that weak discriminator is allocated.

On the other hand, if the program 110 determines in step S303 that no abort instruction was issued, the process advances to step S304. The program 110 checks in step S304 if the weak discriminator processed in step S302 is the last weak discriminator (a weak discriminator located at a leaf position of the tree structure) in the detection processing program 110.

If the program 110 determines that the processed weak discriminator is the last weak discriminator, the process advances to step S307 to end the processing of the detection processing program 110 at the current position of the processing window 601. In this case, at the current position of the processing window 601, the program 110 determines that a target object to be detected in a branch destination where that weak discriminator is allocated.

On the other hand, if the program 110 determines that the processed weak discriminator is not the last weak discriminator, in step S305 it selects a next weak discriminator which is to execute processing (the selection method of a weak discriminator will be described later). The process returns to step S302, and the selected next weak discriminator executes processing.

In this way, the detection processing program 110 selects the next weak discriminator which is to execute processing until the abort instruction is issued as the execution result of the processing in the weak discriminator or until processing in the last weak discriminator is executed. The selected weak discriminator executes specified processing.

Although not shown in FIG. 3, upon completion of the processing in step S306 or S307, the program 110 scans the processing window 601 by one, and restarts the processing from step S300.

4. Processing in Weak Discriminator

Details of the processing in each weak discriminator in step S302 in FIG. 3 will be described below.

Figure 4:
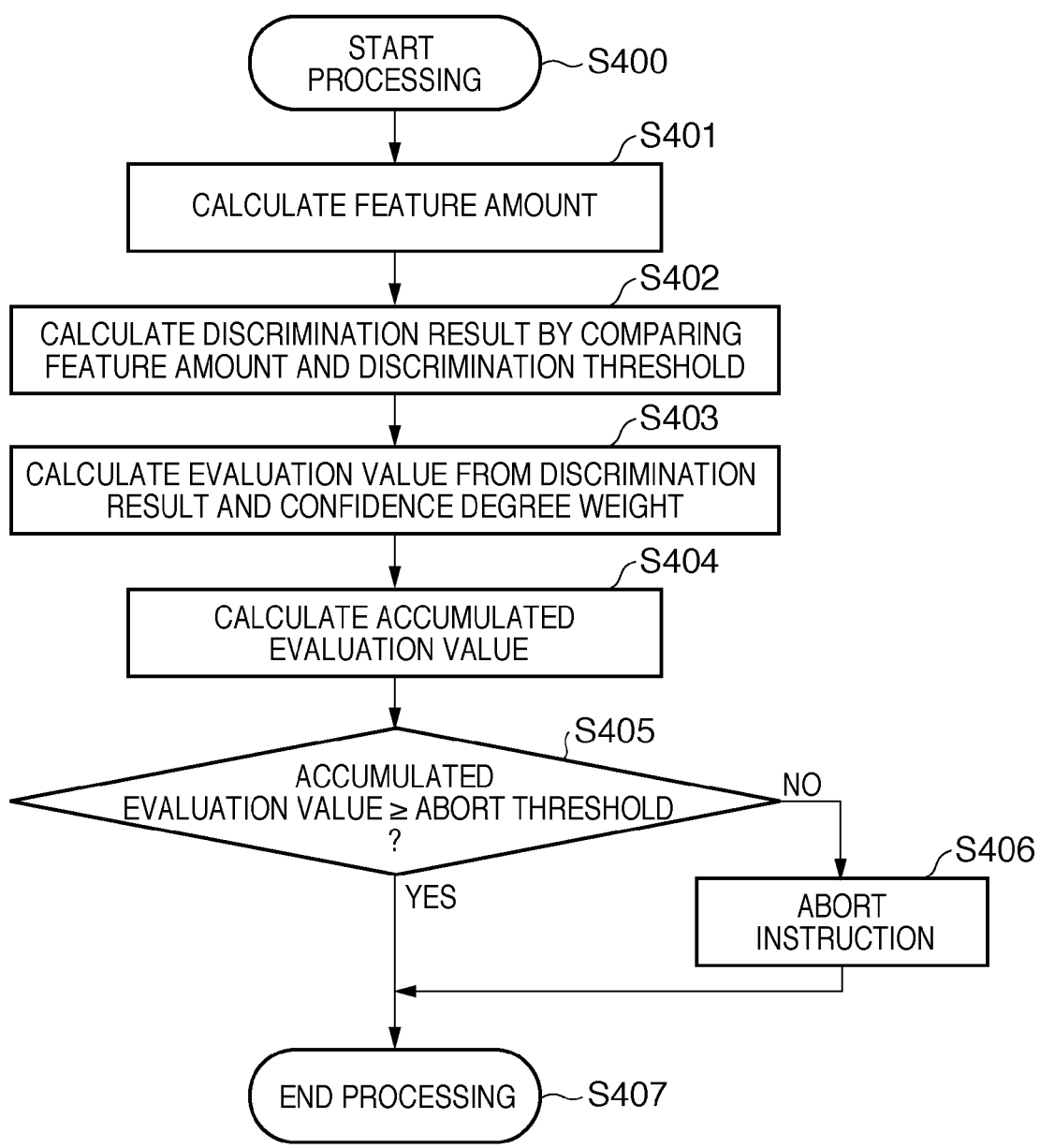
FIG. 4 is a flowchart showing the sequence of processing in each weak discriminator.

FIG. 4 is a flowchart showing the sequence of processing in each weak discriminator. The processing in each weak discriminator of this embodiment is basically the same as that described in reference 1.

In this case, parameters that specify each weak discriminator are determined by an ensemble learning method called AdaBoost. Note that the parameters in this case include "feature amount calculation parameters", a "discrimination threshold", "confidence degree weight", "abort threshold", and the like, as described above.

However, the processing in each weak discriminator of this embodiment is not limited to that described in reference 1. Also, the parameters that specify each weak discriminator are not limited to those determined by the ensemble learning method called AdaBoost.

Upon starting the processing of a weak discriminator in step S400 in FIG. 4, the weak discriminator calculates a feature amount based on the "feature amount calculation parameters" in step S401. In step S401, the weak discriminator outputs, as a feature amount, a normalized value of filter values obtained by applying filter calculations to respective pixel values that form the readout image data in the processing window 601.

Note that rectangular filter calculations described in reference 1 are applied as the filter calculations in this step. Reference numeral 602 in FIG. 6 denotes an example of a rectangular filter. A filter value is calculated by subtracting the sum total of pixel values in a black region from that of pixel values in a white region in the processing window 601.

Note that an integral image may be used, as described in reference 1, so as to calculate the sum total of pixel values at high speed. Also, a filter value is normalized using an average and standard deviation of pixel values of a predetermined region in the processing window 601. In this case, the position and size of the rectangular region and filter coefficient values (+1 or −1) to be set in the filter calculations are used as the feature amount calculation parameters.

In step S402, the weak discriminator compares the feature amount calculated in step S401 with a discrimination threshold, and outputs a discrimination result. That is, the discrimination result is a comparison result between the feature amount and discrimination threshold. In this embodiment, if the feature amount is equal to or larger than the discrimination threshold, +1 is output as a discrimination result; otherwise, −1 is output as a discrimination result.

In step S403, the weak discriminator calculates an evaluation value based on the discrimination result in step S402 and a confidence degree weight. In this embodiment, the product of the discrimination result and confidence degree weight is used as an evaluation value.

Furthermore, in step S404 the weak discriminator calculates an accumulated evaluation value by accumulating the evaluation values output by the previous weak discriminators including itself. However, the weak discriminator 200 uses the output evaluation value as an accumulated evaluation value.

In step S405, the weak discriminator compares the accumulated evaluation value calculated in step S404 with an abort threshold. If the weak discriminator determines in step S405 that the accumulated evaluation value is less than the abort threshold, the process advances to step S406 to output an abort instruction. After that, the processing ends in step S407.

On the other hand, if the weak discriminator determines in step S405 that the accumulated evaluation value is equal to or larger than the abort threshold, the process advances to step S407, thus ending the processing without outputting any abort instruction. The abort instruction output in step S406 is used in the checking process in step S303 in FIG. 3.

Note that reference 1 adopts a configuration in which an abort instruction based on the process in step S405 is issued by a strong discriminator unit including a plurality of weak discriminators. The present invention is also applicable to such configuration (see the fourth embodiment for details).

5. Selection Processing in Weak Discriminator

Details of the selection processing in each weak discriminator in step S305 in FIG. 3 will be described below.

Figure 5:
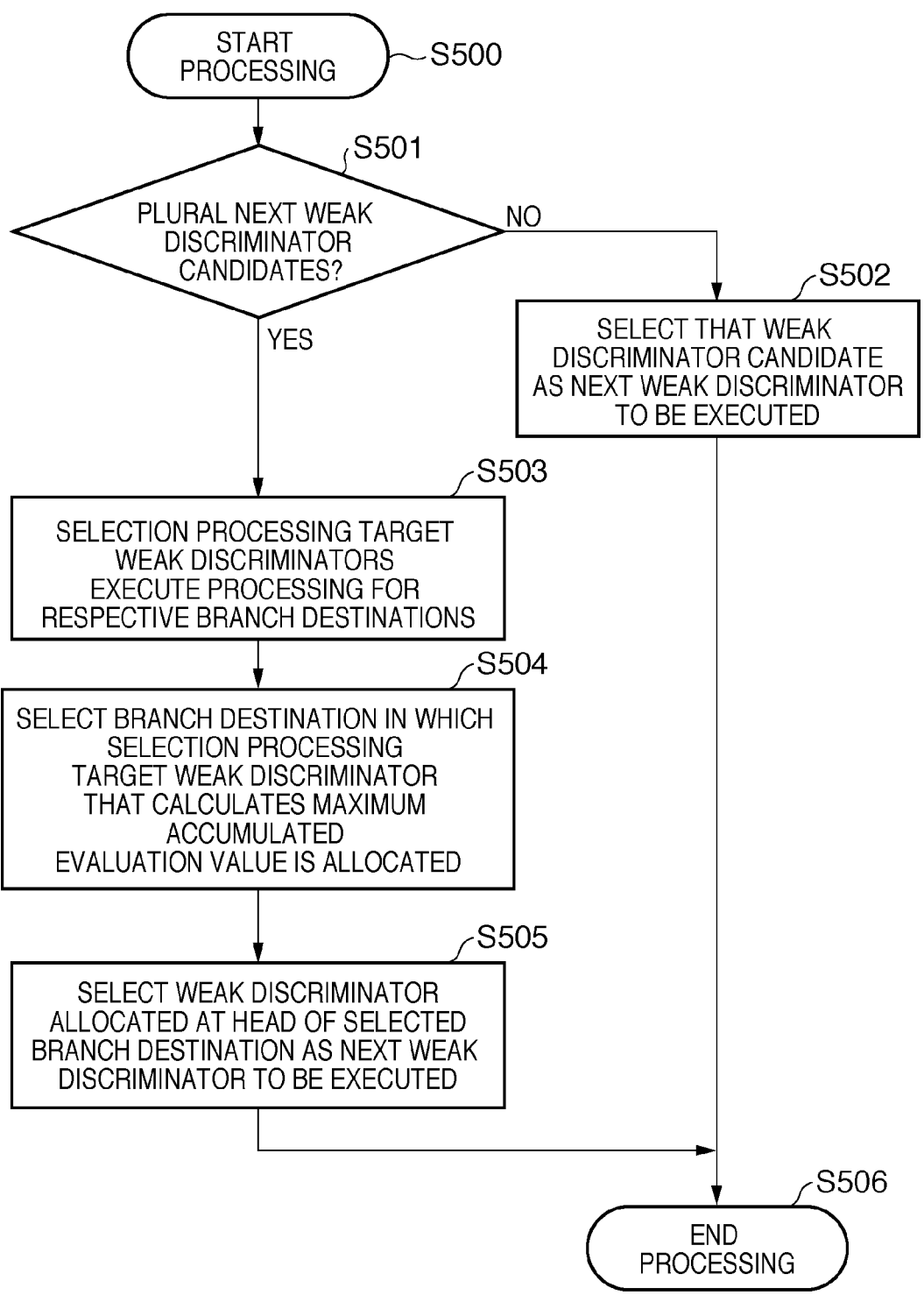
FIG. 5 is a flowchart showing the sequence of selection processing for selecting a next weak discriminator to be executed.

FIG. 5 is a flowchart showing the sequence of the selection processing for selecting a next weak discriminator to be executed when the weak discriminators are allocated in the tree structure, as shown in FIG. 2.

Upon starting the selection processing of a weak discriminator in step S500 in FIG. 5, a certain weak discriminator checks in step S501 if there is a plurality of candidates of next weak discriminators to be executed (weak discriminator candidates, that is, other weak discriminators directly connected to a lower layer of the weak discriminator which is currently executing the processing). In the example of FIG. 2, for example, only the weak discriminator 201 is a candidate of a weak discriminator to be executed next to the weak discriminator 200, while three weak discriminators 204-A, 204-B, and 204-C are the candidates of weak discriminators to be executed next to the weak discriminator 203.

If the weak discriminator determines in step S501 that there is only one weak discriminator candidate, the process advances to step S502 to select that weak discriminator candidate as the next weak discriminator to be executed. On the other hand, if the weak discriminator determines in step S501 that there is a plurality of weak discriminator candidates, the process advances to step S503.

In the present invention, the weak discriminator serving as a branch point selects a branch destination using feature amounts calculated by some weak discriminators ("selection processing target weak discriminators") of those allocated in respective branch destinations each including the candidate of the next weak discriminator to be executed as a head.

In step S503, selection processing target weak discriminators allocated in respective branch destinations execute processing. The contents of the processing are as have been explained above using FIG. 4, and an accumulated evaluation value is finally calculated. Since the selection processing target weak discriminators are allocated for respective branch destinations, the accumulated evaluation values as many as the number of branch destinations are calculated.

In step S504, the weak discriminator compares the accumulated evaluation values calculated in step S503 to specify a selection processing target weak discriminator that calculates a maximum accumulated evaluation value. Furthermore, the weak discriminator selects a branch destination in which the specified selection processing target weak discriminator is allocated.

In step S505, the weak discriminator selects a weak discriminator allocated at the head of the selected branch destination as the next weak discriminator to be executed. Then the process ends in step S506.

6. Operation Example of Detection Processing Program

The actual execution sequence of the processing of the detection processing program 110, the module configuration of which is shown in FIG. 2, will be described with reference to FIGS. 3 to 5 using practical examples.

In the detection processing program 110 of this embodiment with the module configuration shown in FIG. 2, the weak discriminator 203 serves as a branch point (three branches). In the following description, a branch destination in which the weak discriminators 204-A to 208-A are allocated will be referred to as branch A, that in which the weak discriminators 204-B to 208-B are allocated will be referred to as branch B, and that in which the weak discriminators 204-C to 208-C are allocated will be referred to as branch C.

The sequence to be executed in the detection processing program 110 will be described below separately as operation examples 1 to 3.

6.1 Operation Example 1

Case without Abort Instruction

As operation example 1, an operation when no abort instruction is output until the last weak discriminator in the branch destination is reached will be explained (note that an operation when an abort instruction is output during detection will be explained in operation example 2).

When respective pixel values of image data in the processing window 601 are input, the processing of the weak discriminator 200 is executed first (step S302). Since the weak discriminator 200 does not output any abort instruction, the detection processing program 110 determines in step S303 that no abort instruction was output, and the process advances to step S304. Since the weak discriminator 200 is not the last weak discriminator, the process advances to step S305 to start the selection processing.

Since only the weak discriminator 201 is allocated as a lower layer of the weak discriminator 200, the weak discriminator 200 determines in step S501 that there are not a plurality of weak discriminator candidates, and the process advances to step S502. Then, the weak discriminator 200 selects the weak discriminator 201 as the next weak discriminator to be executed.

The weak discriminator 201 selected as the next weak discriminator to be executed executes processing for respective pixel values of the image data in the processing window 601. As a result of the progress of processes as in the case of the weak discriminator 200, the weak discriminator 201 selects the weak discriminator 202 as the next weak discriminator to be executed.

The weak discriminator 202 selected as the next weak discriminator to be executed executes processing for respective pixel values of the image data in the processing window 601. As a result of the progress of processes as in the case of the weak discriminator 200, the weak discriminator 202 selects the weak discriminator 203 as the next weak discriminator to be executed.

The weak discriminator 203 selected as the next weak discriminator to be executed executes processing for respective pixel values of the image data in the processing window 601, and the processes progress as in the case of the weak discriminator 200. However, in case of the weak discriminator 203, there are three weak discriminators, that is, the weak discriminators 204-A, 204-B, and 204-C as candidates of next weak discriminators to be executed. For this reason, the weak discriminator 203 determines in step S501 that there are a plurality of weak discriminator candidates, and the process advances to step S503.

In step S503, the selection processing target weak discriminators allocated in the respective branch destinations execute processing. In this example, the weak discriminators 204-A, 204-B, and 204-C execute the processing in FIG. 4, and finally calculate accumulated evaluation values.

In step S504, the weak discriminator 203 compares the accumulated evaluation values calculated in step S503 to specify a selection processing target weak discriminator which calculates a maximum accumulated evaluation value. Assume that the weak discriminator 204-B outputs a maximum accumulated evaluation value in this example. For this reason, the weak discriminator 203 selects, as the branch destination, branch B in which the weak discriminator 204-B is allocated.

In step S505, the weak discriminator 203 selects, as the next weak discriminator to be executed, the weak discriminator 204-B allocated at the head of selected branch B. Note that since the processing of the weak discriminator 204-B has already been executed once in the selection processing, if the processing result at that time (the presence/absence of an abort instruction and accumulated evaluation value) is stored, the weak discriminator 204-B need not execute the processing again.

Therefore, in step S505 the weak discriminator 203 skips the weak discriminator 204-B and selects the weak discriminator 205-B as the next weak discriminator to be executed (of course, after the weak discriminator 204-B executes processing again, the weak discriminator 205-B may execute processing).

The same processes as in the case of the weak discriminators 200 to 202 are executed for the weak discriminator 205-B and subsequent weak discriminators, and each weak discriminator selects the next (right neighboring in case of FIG. 2) weak discriminator as the next weak discriminator to be executed.

As described above, in operation example 1, no abort instruction is output until the last weak discriminator is reached. For this reason, upon execution of the processing of the weak discriminator 208-B, the detection processing program 110 determines in step S307 that a target object (front-view face) is detected, and ends its detection processing for the image data in the current processing window 601.

In general, when weak discriminators have learned using a Boosting learning method such as AdaBoost or the like, and are allocated, the accumulated evaluation value can be considered as a value obtained by weighting respective weak discriminators by degrees of confidence and taking the majority. Therefore, when the branch destination is selected based on the comparison result of the accumulated evaluation values, the branch destination optimal to detect a target object can be selected.

As described above, according to the detection processing program 110, no special processing is executed for the selection processing in the selection processing from the weak discriminator 203 to the weak discriminator 204-B. That is, even the selection processing target weak discriminators execute the same processing as the processing contents executed in other weak discriminators which are not related to branching, and the values (accumulated evaluation values) calculated as the processing results are compared to implement the selection processing. Therefore, the need for a special scheme exclusively for the selection processing can be obviated, and the computation volume can be reduced, that is, the processing time can be shortened.

6.2 Operation Example 2

Case with Abort Instruction

As operation example 2, an operation when an abort instruction is output before the last weak discriminator is reached will be explained. For example, an operation when the weak discriminator 201 outputs an abort instruction will be explained.

The processing in the weak discriminator 200 is the same as that in the weak discriminator 200 described in operation example 1 above.

After that, the weak discriminator 200 selects the weak discriminator 201 as the next weak discriminator to be executed. When the processing of the weak discriminator 201 is executed in step S302, the weak discriminator 201 outputs an abort instruction in step S406. As a result, the detection processing program 110 determines in step S303 that the abort instruction was issued, and determines in step S306 that no target object is detected, thus ending the detection processing in the current processing window.

As described above, according to the detection processing program 110, since the weak discriminators are allocated in the tree structure, the weak discriminators allocated before the selection processing target weak discriminators can discriminate the presence/absence of a target object to some extent. As a result, the selection processing can be omitted, thus improving the processing efficiency.

6.3 Operation Example 3

Case without Abort Instruction

As operation example 3, an operation when no abort instruction is output until the last weak discriminator in the branch destination is reached will be described. Note that in operation example 1, the weak discriminators 204-A, 204-B, and 204-C execute processing as the selection processing target weak discriminators, and calculate accumulated evaluation values, thereby selecting the branch destination. By contrast, in operation example 3, the weak discriminators 204-A to 206-A, 204-B to 206-B, and 204-C to 206-C execute processing as the selection processing target weak discriminators, and calculate accumulated evaluation values, thereby selecting the branch destination.

The processes of the weak discriminators 200, 201, and 202 are the same as those in the weak discriminators 200, 201, and 202 described in operation example 1.

After that, the weak discriminator 203 is selected as the next weak discriminator to be executed, and executes processing. Then, the detection processing program 110 executes the selection processing for selecting the next weak discriminator to be executed in step S305. At this time, there are three weak discriminators, that is, the weak discriminators 204-A, 204-B, and 204-C as candidates of weak discriminators to be executed next to the weak discriminator 203. For this reason, the selection processing target weak discriminators allocated in the respective branch destinations execute processing in step S503.

In this operation example 3, in branch A, the weak discriminators execute processing and calculate accumulated evaluation values in the order of the weak discriminators 204-A, 205-A, and 206-A. Likewise, the weak discriminators execute processing and calculate accumulated evaluation values in respective branches in the order of the weak discriminators 204-B, 205-B, and 206-B in branch B, and in the order of the weak discriminators 204-C, 205-C, and 206-C in branch C.

In step S504, the weak discriminator 203 compares the accumulated evaluation values of the respective branch destinations calculated in step S503, and selects the branch destination in which a maximum accumulated evaluation value is calculated. More specifically, the weak discriminator 203 compares the accumulated evaluation value calculated upon execution of the processing by the weak discriminator 206-A, that calculated upon execution of the processing by the weak discriminator 206-B, and that calculated upon execution of the processing by the weak discriminator 206-C.

Assume that in this operation example 3, the weak discriminator 206-B calculates a maximum accumulated evaluation value. In this case, in step S504 the weak discriminator 203 selects branch B in which the weak discriminator 206-B is allocated as the branch destination.

Subsequently, in step S505 the weak discriminator 203 selects, as the next weak discriminator to be executed, the weak discriminator 204-B allocated at the head of selected branch B. However, in case of operation example 3, the processes of the weak discriminators 204-B, 205-B, and 206-B have already been executed during the selection processing (in step S504). Therefore, when the execution result (the presence/absence of an abort instruction and accumulated evaluation value) of each weak discriminator executed during the selection processing is stored, the weak discriminators 204-B, 205-B, and 206-B need not execute processing again.

Therefore, in step S505 the weak discriminator 203 skips the weak discriminators 204-B, 205-B, and 206-B, and selects the weak discriminator 207-B as the next weak discriminator to be executed.

The same processes as in the case of the weak discriminators 200 to 202 are executed for the weak discriminator 207-B and subsequent weak discriminator, and each weak discriminator selects the next (right neighboring) weak discriminator as the next weak discriminator to be executed.

In operation example 3, no abort instruction is output until the last weak discriminator 208-B is reached. For this reason, upon execution of the processing of the weak discriminator 208-B, the detection processing program 110 determines in step S307 that a target object (front-view face) is detected, thus ending the detection processing for the image data in the current processing window.

As described above, when the weak discriminators have learned using a Boosting learning method such as AdaBoost or the like, and are allocated, the accumulated evaluation value can be considered as a value obtained by weighting respective weak discriminators by degrees of confidence and taking the majority. Therefore, when the branch destination is selected based on the comparison result of the accumulated evaluation values, the branch destination optimal to detect a target object can be selected.

As a larger number of weak discriminators are used to calculate accumulated evaluation values, the reliability of the accumulated evaluation value is improved. Therefore, operation example 3 in which the accumulated evaluation values of three weak discriminators in turn from the head of each branch destination are calculated can select the branch destination with higher reliability than operation example 1 in which only accumulated evaluation values of head weak discriminators in respective branch destinations are calculated.

As described above, in case of any of operation examples 1 to 3, according to this embodiment, target objects of a plurality of types in image data can be detected at high speed.

Second Embodiment

In the first embodiment, the branch destination is selected by comparing the accumulated evaluation values calculated in the respective branch destinations in the selection processing. However, the present invention is not limited to this. For example, a branch destination may be selected by comparing, for respective branch destinations, the numbers of weak discriminators, in each of which the calculated feature amount is equal to or larger than a predetermined threshold, of those in the branch destinations.

1. Selection Processing in Weak Discriminator

Figure 7:
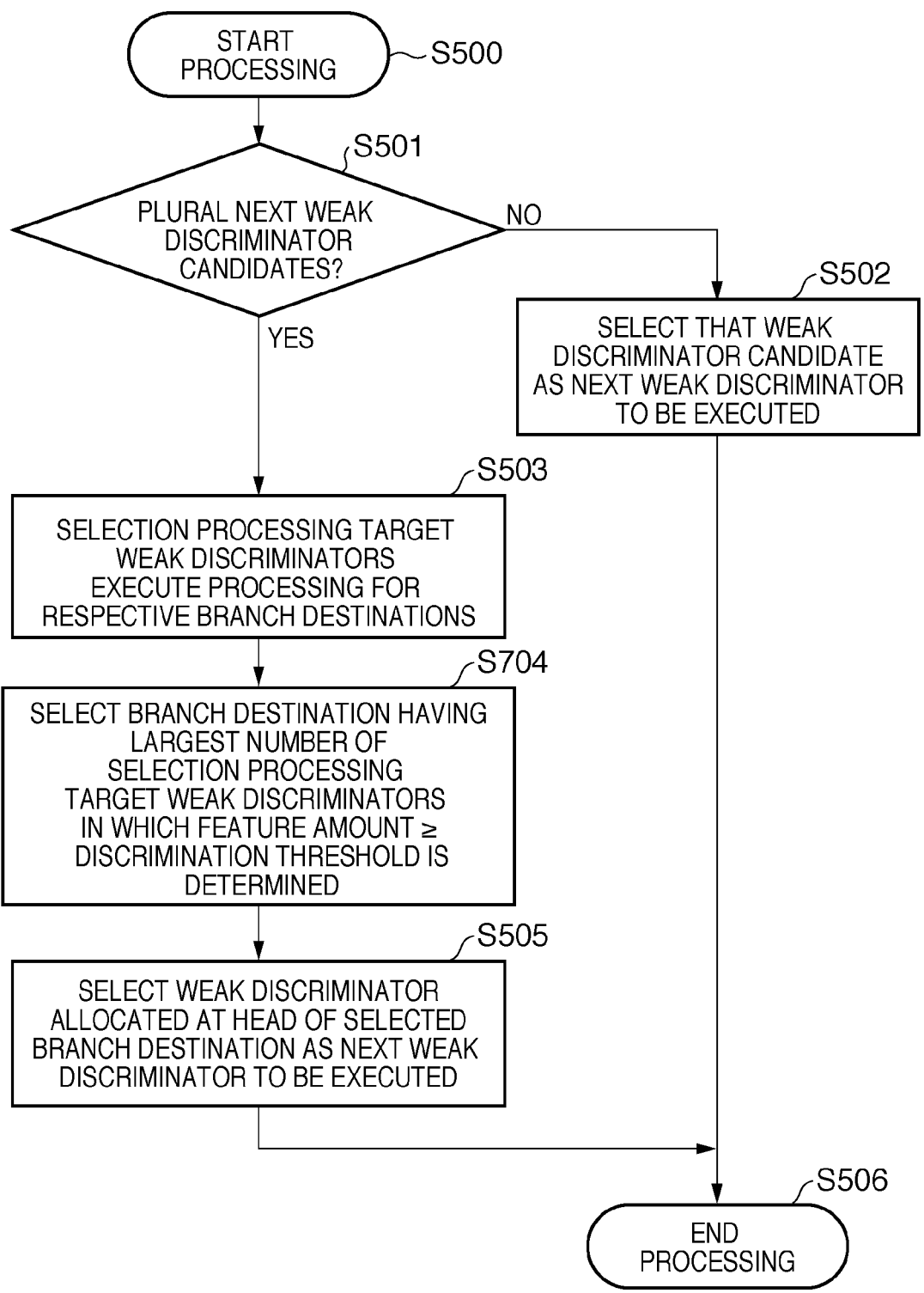
FIG. 7 is a flowchart showing the sequence of selection processing for selecting a next weak discriminator to be executed in an image processing apparatus according to the second embodiment of the present invention.

FIG. 7 is a flowchart showing the sequence of selection processing for selecting the next weak discriminator to be executed in an image processing apparatus according to this embodiment. Note that a difference from FIG. 5 will be described for the sake of simplicity.

The processes in steps S500 to S503 are the same as those in the corresponding steps in FIG. 5.

The weak discriminator checks in step S704 if the feature amounts calculated by executing processing of weak discriminators in respective branch destinations are equal to or larger than a discrimination threshold. The weak discriminator counts the number of weak discriminators, in each of which the calculated feature amount is equal to or larger than the discrimination threshold, for each branch destination, and compares these count values. As a result, the weak discriminator selects the branch destination which includes the largest number of weak discriminators in each of which the calculated feature amount is equal to or larger than the discrimination threshold.

In step S505, the weak discriminator selects a weak discriminator allocated at the head of the branch destination selected in step S704 as the next weak discriminator to be executed.

2. Operation Example of Detection Processing Program 110

A practical operation example executed by the detection processing program 110 of this embodiment will be described below.

The processes in the weak discriminators 200 to 202 are the same as those in operation example 3 in the first embodiment.

After that, the weak discriminator 203 is selected as the next weak discriminator to be executed, and executes processing. Then, the detection processing program 110 executes the selection processing for selecting the next weak discriminator to be executed in step S305. At this time, there are three weak discriminators, that is, the weak discriminators 204-A, 204-B, and 204-C as candidates of weak discriminators to be executed next to the weak discriminator 203. For this reason, the process advances to step S503.

In step S503, selection processing target weak discriminators allocated in the respective branch destinations execute processing. Therefore, in this operation example, respective weak discriminators execute processing in the order of the weak discriminators 204-A, 205-A, and 206-A in branch A. That is, each weak discriminator calculates a feature amount in step S401, and compares the feature amount and discrimination threshold to calculate a discrimination result in step S402. Furthermore, each weak discriminator calculates an accumulated evaluation value in step S404. Likewise, respective weak discriminators execute processing in the order of the weak discriminators 204-B, 205-B, and 206-B in branch B, and in the order of the weak discriminators 204-C, 205-C, and 206-C in branch C, thereby outputting discrimination results and calculating the accumulated evaluation values in these branches.

After that, in step S704 the weak discriminator 203 selects a branch destination based on the discrimination results output in step S503. More specifically, the weak discriminator 203 counts the number of weak discriminators, in each of which the feature amount≧the discrimination threshold is determined in step S503, for each branch destination, and selects the branch destination with the largest count value.

For example, assume that the feature amount≧the discrimination threshold is determined in the processes of the weak discriminators 204-A and 205-A in branch A (assume that the feature amount<the discrimination threshold is determined in the process of the weak discriminator 206-A).

Likewise, assume that the feature amount≧the discrimination threshold is determined in the processes of the weak discriminators 204-B, 205-B, and 206-B in branch B. Furthermore, assume that the feature amount≧the discrimination threshold is determined in the processes of the weak discriminators 204-C and 205-C in branch C (assume that the feature amount<the discrimination threshold is determined in the process of the weak discriminator 206-C).

In such case, since branch A=2, branch B=3, and branch C=2 as the number of weak discriminators in which the feature amount≧the discrimination threshold is determined, the weak discriminator 203 selects branch B as the branch destination.

Subsequently, in step S505 the weak discriminator 203 selects the weak discriminator 204-B allocated at the head of selected branch B as the next weak discriminator to be executed.

In case of this operation example, the weak discriminators 204-B, 205-B, and 206-B have already executed their processes during the selection processing. Therefore, when each execution result (the presence/absence of an abort instruction and accumulated evaluation value) during the selection processing is stored, the processes of the weak discriminators 204-B, 205-B, and 206-B need not be executed again. Therefore, in step S505 the weak discriminator 203 skips the weak discriminators 204-B, 205-B, and 206-B, and selects the weak discriminator 207-B as the next weak discriminator to be executed.

The same processes as in the case of the weak discriminators 200 to 202 are executed for the weak discriminator 207-B and subsequent weak discriminator, and each weak discriminator selects the next (right neighboring) weak discriminator as the next weak discriminator to be executed.

In this operation example, no abort instruction is output until the last weak discriminator is reached. For this reason, upon execution of the processing of the weak discriminator 208-B, the detection processing program 110 determines in step S307 that a target object (front-view face) is detected, thus ending the detection processing for the image data in the current processing window.

As described above, this embodiment uses, as a selection index in the selection processing, the number of weak discriminators which output the discrimination results that meet a predetermined condition (the number of weak discriminators in each of which the feature amount≧the discrimination threshold is determined) in place of the accumulated evaluation value. Hence, in case of this embodiment, the selection processing can be executed without using the degree of confidence appended to each weak discriminator.

In general, weak discriminators in each branch destination (for example, the weak discriminators 204-A to 208-A allocated in branch A) have learned by ensemble learning for each branch. In this case, respective branch destinations generally have different difficulty levels of learning. Also, as might be expected, learning data required upon learning are different for respective branch destinations.

Therefore, depending on contents to be categorized (categorized into a front-view face, right-view face, and left-view face in this embodiment), it is often inadequate to compare the values of the degrees of confidence generated as results of learning (or accumulated evaluation values calculated using the degrees of confidence) among the branch destinations.

In such case, it is effective to select the branch destination using the number of weak discriminators in each of which the feature amount≧the discrimination threshold is determined, in place of the accumulated evaluation value, like in this embodiment.

As another selection processing, the accumulated evaluation values of respective branches may be compared after they are normalized by an arbitrary method, thus selecting the branch destination.

Third Embodiment

In the first embodiment, in selection processing, a branch destination is selected by comparing the accumulated evaluation values each calculated by one or a plurality of weak discriminators in respective branch destinations. However, the present invention is not limited to this. For example, selection thresholds may be set for respective branch destinations, and a branch destination in which the accumulated evaluation value exceeds the selection threshold earliest may be selected.

1. Selection Processing in Weak Discriminator

Figure 8:
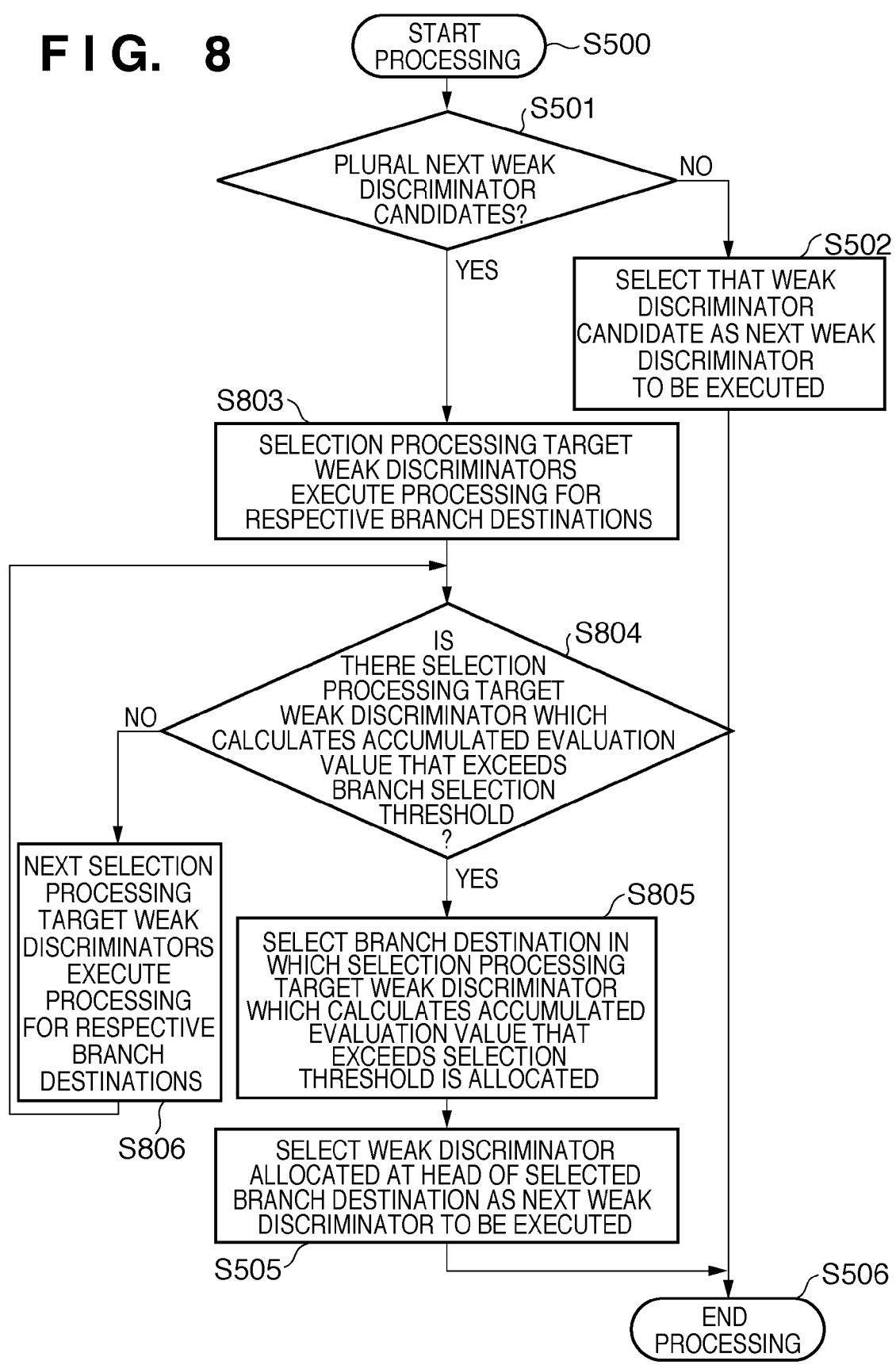
FIG. 8 is a flowchart showing the sequence of selection processing for selecting a next weak discriminator to be executed in an image processing apparatus according to the third embodiment of the present invention.

FIG. 8 is a flowchart showing the sequence of selection processing for selecting the next weak discriminator to be executed in an image processing apparatus according to this embodiment. Note that a difference from FIG. 5 will be described for the sake of simplicity.

The processes in steps S500 to S502 are the same as those in the corresponding steps in FIG. 5.

If the weak discriminator determines in step S501 that there are a plurality of candidates of next weak discriminators to be executed, the process advances to step S803.

In step S803, head selection processing target weak discriminators (weak discriminators 204-A, 204-B, and 204-C) of those allocated in the respective branch destinations execute processing, and calculate accumulated evaluation values (see FIG. 4 for the contents of the processing).

In step S804, the weak discriminator compares selection thresholds set in advance for the respective branch destinations with the accumulated evaluation values calculated in step S803 to check if there is a selection processing target weak discriminator which calculated the accumulated evaluation value exceeding the selection threshold.

If the weak discriminator determines in step S804 that there is a selection processing target weak discriminator which calculated the accumulated evaluation value exceeding the selection threshold, it selects a branch destination in which that selection processing target weak discriminator is allocated in step S805.

On the other hand, if the weak discriminator determines in step S804 that there is no selection processing target weak discriminator which calculated the accumulated evaluation value exceeding the selection threshold, the process advances to step S806.

In step S806, the selection processing target weak discriminators allocated at the next position (weak discriminators 205-A, 205-B, and 205-C) in the respective branch destinations execute processing and calculate accumulated evaluation values. After that, the process returns to step S804.

By executing the selection processing shown in FIG. 8 in this way, a branch destination in which the selection processing target weak discriminator which calculated the accumulated evaluation value exceeding the selection threshold first is selected.

2. Operation Example of Detection Processing Program

A practical operation example executed by the detection processing program 110 of this embodiment will be described below.

The processes in the weak discriminators 200, 201, and 202 are the same as those in operation example 3 in the first embodiment.

After that, the weak discriminator 203 is selected as the next weak discriminator to be executed, and executes processing. Then, the detection processing program 110 determines in step S305 that there are three weak discriminators, that is, the weak discriminators 204-A, 204-B, and 204-C as candidates of next weak discriminators to be executed. As a result, the process advances to step S803.

In step S803, the head selection processing target weak discriminators (weak discriminators 204-A, 204-B, and 204-C) of those allocated in the respective branch destinations execute processing.

That is, the weak discriminator 204-A executes the processing shown in FIG. 4, and calculates an accumulated evaluation value in branch A. Likewise, the weak discriminators 204-B and 204-C execute the processing shown in FIG. 4 in branches B and C and calculate accumulated evaluation values in these branch destinations.

After that, in step S804 the weak discriminator 203 compares selection thresholds set in advance for the respective branch destinations with the accumulated evaluation values calculated for the respective branch destinations. In this operation example, assume that none of the accumulated evaluation values calculated by the weak discriminators 204-A, 204-B, and 204-C exceed the selection thresholds.

For this reason, in step S806 the weak discriminator 203 selects the next selection processing target weak discriminators for the respective branch destinations. That is, the weak discriminator 203 selects the weak discriminator 205-A in branch A, the weak discriminator 205-B in branch B, and the weak discriminator 205-C in branch C, respectively. Subsequently, the selected weak discriminators calculate accumulated evaluation values.

Then, in step S804 the weak discriminator 203 compares the selection thresholds set in advance for the respective branch destinations with the accumulated evaluation values calculated for the respective branch destinations. In this operation example, assume that the accumulated evaluation value calculated by the weak discriminator 205-B exceeds the selection threshold.

As a result, in step S805 the weak discriminator 203 selects, as the branch destination, branch B in which the weak discriminator 205-B is allocated.

Subsequently, in step S505 the weak discriminator 203 selects the weak discriminator 204-B allocated at the head of selected branch B as the next weak discriminator to be executed. However, in case of this operation example, the weak discriminators 204-B and 205-B have already executed their processes during the selection processing. Therefore, when the processing result (the presence/absence of an abort instruction and accumulated evaluation value) in step S302 executed during the selection processing is stored, the weak discriminators 204-B and 205-B need not execute processing again.

Therefore, in step S505 the weak discriminator 203 skips the weak discriminators 204-B and 205-B, and selects the weak discriminator 206-B as the next weak discriminator to be executed.

The same processes as in the case of the weak discriminators 200 to 202 are executed for the weak discriminator 206-B and subsequent weak discriminators, and each weak discriminator selects the next (right neighboring) weak discriminator as the next weak discriminator to be executed.

In this operation example, no abort instruction is output until the last weak discriminator 208-B is reached. For this reason, upon execution of the processing of the weak discriminator 208-B, the detection processing program 110 determines in step S307 that a detection object (front-view face) is detected, thus ending the detection processing for the image data in the current processing window.

As described above, when weak discriminators have learned using a Boosting learning method such as AdaBoost or the like, and are allocated, the accumulated evaluation value can be considered as a value obtained by weighting respective weak discriminators by degrees of confidence and taking the majority.

Therefore, selecting the branch destination in which the weak discriminator whose accumulated evaluation value exceeds a certain value (selection threshold) is not only to select one with highest reliability of the branch destinations but also to allow selection with reliability to some extent even as absolute comparison. As a result, the branch destination can be selected with higher reliability.

Note that the selection thresholds may be determined in advance using a method such as learning or the like. In this operation example, the selection thresholds are set for the respective branch destinations. However, the selection threshold may assume a value common to all the branch destinations.

Fourth Embodiment

In the first to third embodiments, the detection processing in the module configuration shown in FIG. 2 has been explained. However, the module configuration of an image processing apparatus according to the present invention is not limited to this. Detection processing in case of a module configuration different from FIG. 2 will be described below.

1. Module Configuration of Detection Processing Program 920

Figure 9:
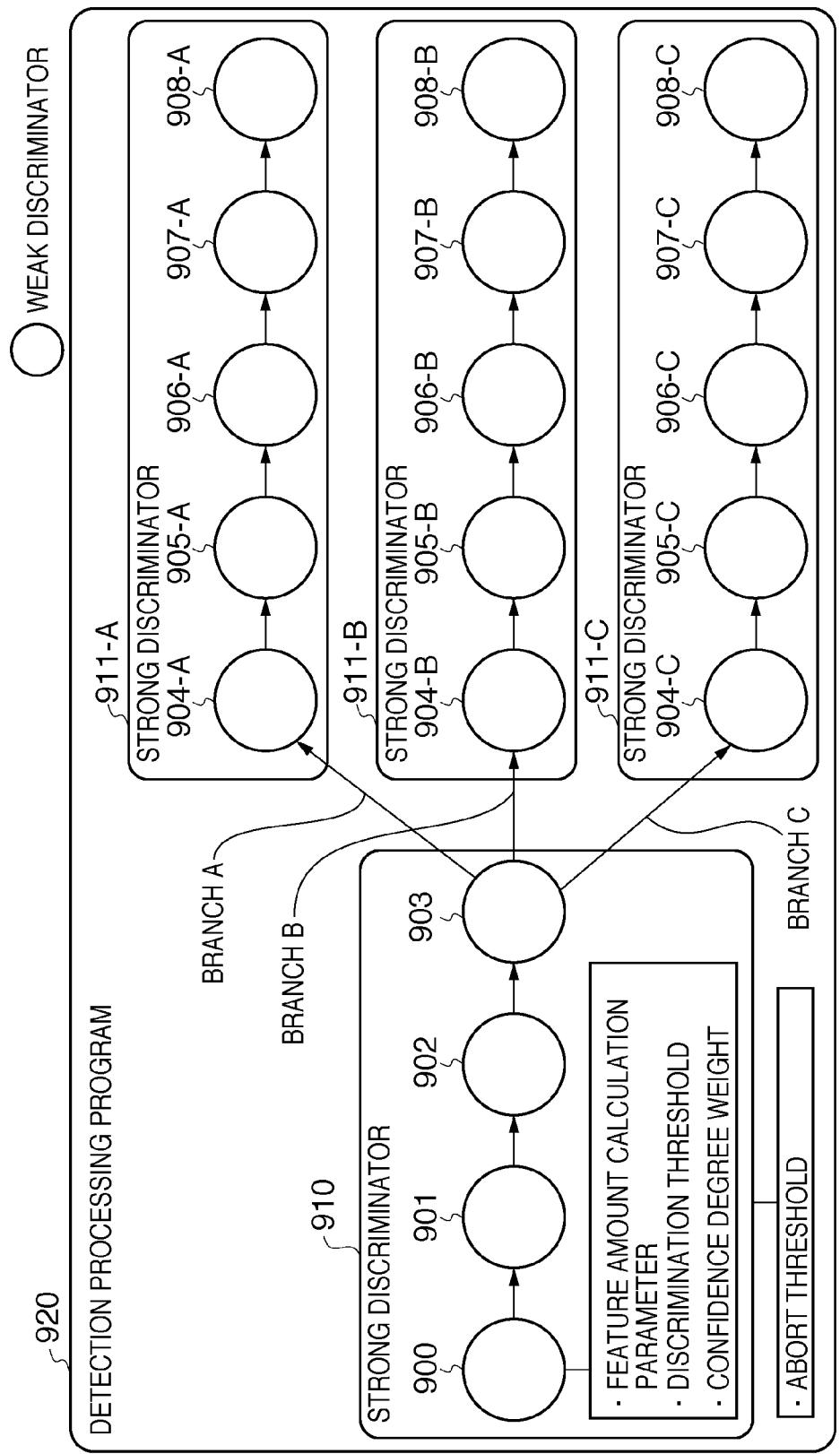
FIG. 9 is a view showing the module configuration of a detection processing program in an image processing apparatus according to the fourth embodiment of the present invention.

FIG. 9 is a view showing the module configuration of a detection processing program 920 in an image processing apparatus according to this embodiment. As shown in FIG. 9, the detection processing program 920 comprises strong discriminators 910, 911-A, 911-B, 911-C in each of which a plurality of weak discriminators 900 to 903, 904-A to 908-A, 904B to 908-B, 904-C to 908-C are connected in a cascade, respectively, so that each strong discriminator issues an abort instruction.

In FIG. 9, weak discriminator groups included in each rectangular area configure respective strong discriminators. In each weak discriminator which configures the strong discriminator, "feature amount calculation parameters", a "discrimination threshold", and "confidence degree weight" are determined as parameters that specify the weak discriminator of interest. Each weak discriminator executes processing using these parameters (details of the processing will be described later).

For each strong discriminator, an "abort threshold" is set. Note that FIG. 9 describes only the parameters for a weak discriminator 900 and strong discriminator 910, and does not show any parameters other than those for the weak discriminator 900 and strong discriminator 910 for the sake of simplicity. However, in practice, assume that parameters are set in all weak discriminators and strong discriminators.

In this embodiment as well, a target object is a human face part as in the first to third embodiments, and a tree structure is defined so that branch A detects a right-view face, branch B detects a front-view face, and branch C detects a left-view face.

2. Sequence of Processing in Detection Processing Program 920

The detection processing program 920 shown in FIG. 9 executes detection processing basically according to the flowchart shown in FIG. 3. However, since the processing in each weak discriminator in step S302 is different, differences of this processing will be mainly explained.

3. Processing in Weak Discriminator

As described above, a difference between the detection processing based on the module configuration of the detection processing program 110 described in the first to third embodiments and that based on the module configuration of the detection processing program 920 of this embodiment lies in an output timing of an abort instruction.

In case of the detection processing program 110, each weak discriminator determines whether or not to output an abort instruction. However, in case of the detection processing program 920, each strong discriminator determines whether or not to output an abort instruction.

Figure 10:
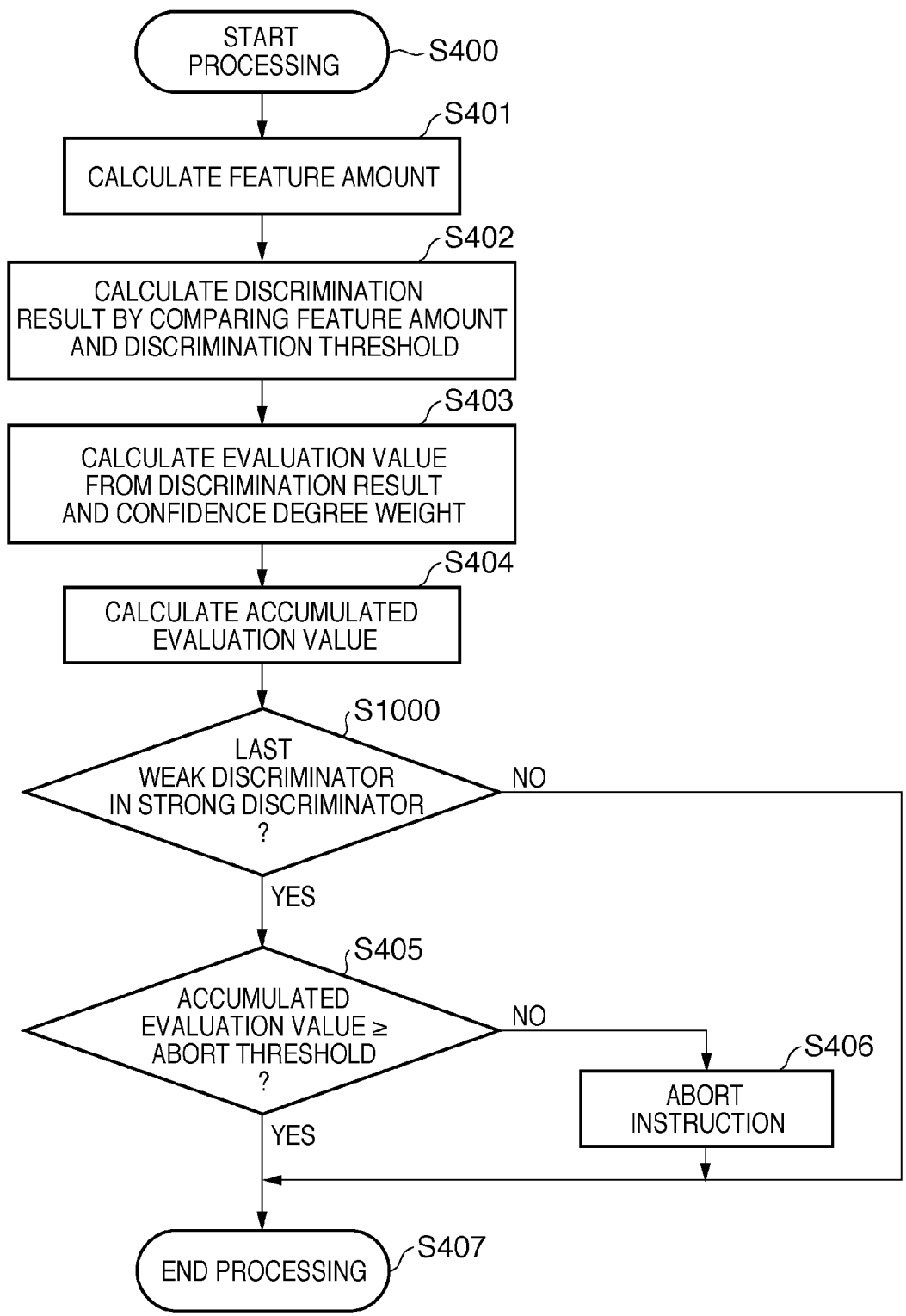
FIG. 10 is a flowchart showing the sequence of processing to be executed in each weak discriminator in the image processing apparatus according to the fourth embodiment of the present invention.

FIG. 10 is a flowchart showing details of processing in each weak discriminator according to this embodiment. A difference between the flowcharts of FIGS. 10 and 4 is whether or not to include the process shown in step S1000. For this reason, the same step numbers in FIG. 10 denote the remaining steps as in FIG. 4, and a repetitive description thereof will be avoided.

A weak discriminator checks in step S1000 in FIG. 10 if the weak discriminator which is currently executing processing is that which is allocated at the rearmost position in the strong discriminator. If the weak discriminator is not that which is allocated at the rearmost position in the strong discriminator, the process advances to step S407, thus ending the processing.

On the other hand, if the weak discriminator is that which is allocated at the rearmost position, the process advances to step S405, and the weak discriminator compares an accumulated evaluation value with an abort threshold. Assume that the abort threshold is assigned in advance to that strong discriminator.

As described above, according to this embodiment, since an abort instruction is issued by each strong discriminator, the computation volume can be reduced compared to a case wherein each weak discriminator makes comparison with an abort threshold.

Fifth Embodiment

In the fourth embodiment, the difference between the detection processing by the detection processing program 920 and that by the detection processing program 110 lies in only the processing in each weak discriminator. However, the present invention is not limited to this. For example, the difference may lie in selection processing of a weak discriminator.

In the selection processing in the first to third embodiments, only one branch destination is selected (for example, a branch destination in which a weak discriminator that outputs a maximum accumulated evaluation value is allocated is selected). By contrast, this embodiment selects, as branch destination candidates: (1) a branch destination in which a selection processing target weak discriminator which outputs a maximum accumulated evaluation value is allocated, and (2) a branch destination in which a selection processing target weak discriminator which outputs an accumulated evaluation value falling within an allowable value range from the maximum accumulated evaluation value is allocated.

That is, in this embodiment, a plurality of branch destinations may be selected.

As the allowable value, appropriate values are set for respective branch destinations or a common value is set for all the branch destinations in advance. In the selection processing, when a plurality of branch destinations is selected as branch destination candidates, processing is executed in turn for each of these branch destinations. The sequence of the selection processing in a weak discriminator will be described below with reference to the flowchart of FIG. 11.

1. Sequence of Processing in Detection Processing Program 920

Figure 11:
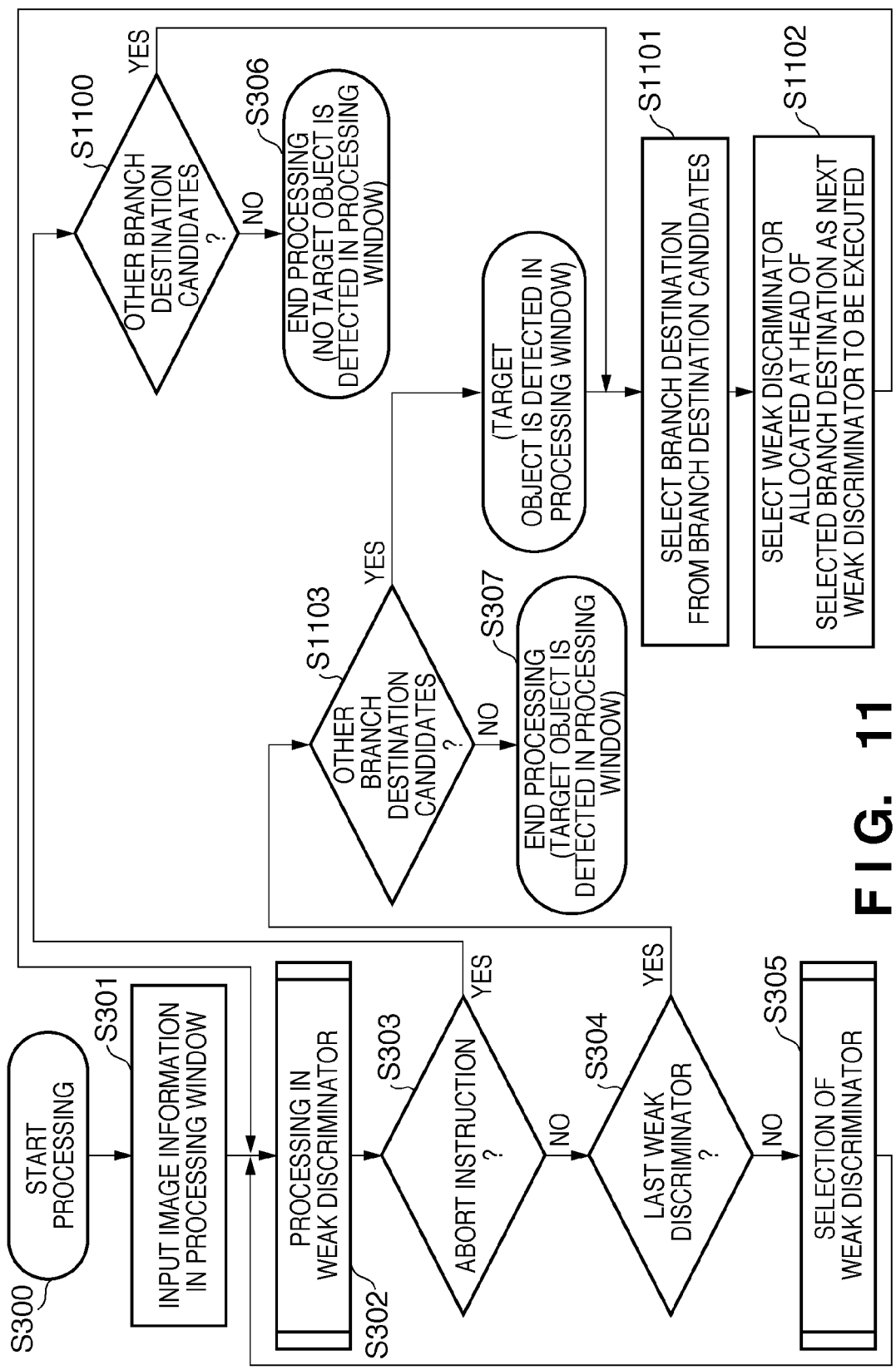
FIG. 11 is a flowchart showing the sequence of processing in the detection processing program in an image processing apparatus according to the fifth embodiment of the present invention.

FIG. 11 is a flowchart showing the sequence of processing in the detection processing program 920 in this embodiment. In this flowchart, the same step numbers denote the same steps as in FIG. 3, and a repetitive description thereof will be avoided.

A difference between FIGS. 11 and 3 is the presence/absence of steps S1100, S1101, S1102, and S1103. In case of FIG. 3, since only one branch destination is selected, if it is determined that an abort instruction was issued in that branch destination (or before branch) (step S303), the processing ends in step S306.

By contrast, in this embodiment, one branch destination is not always selected (details of the selection processing of this embodiment will be described later with reference to FIG. 12), and a plurality of branch destinations may be selected.

Assuming that a plurality of selected branch destinations are referred to as "branch destination candidates", even if it is determined that an abort instruction was issued in one branch destination of the selected branch destination candidates (step S303), the process advances to step S1100 without ending the processing.

The detection processing program 920 checks in step S1100 if other branch destination candidates remain. If the program 920 determines that no branch destination candidate remains, the processing ends in step S306.

On the other hand, if the program 920 determines in step S1100 that other branch destination candidates remain, the process advances to step S1101 to select one branch destination from the branch destination candidates. The selection method at this time is not particularly limited.

After that, in step S1102 the program 920 selects a weak discriminator allocated at the head of the branch destination selected in step S1101 as the next weak discriminator to be executed, and the process returns to step S302.

On the other hand, in case of FIG. 3, if it is determined in step S303 that no abort instruction was issued, and it is determined in step S304 that the weak discriminator of interest is the last weak discriminator, the processing ends in step S307.

By contrast, in this embodiment, even when the weak discriminator of interest is the last weak discriminator in a branch destination which is being processed, since another branch destination candidate may still remain, the program 920 executes, in step S1103, the same examination as in step S1100.

That is, the program 920 checks in step S1103 if other branch destination candidates remain. If the program 920 determines that no branch destination candidate remains, the processing ends in step S307.

On the other hand, if the program 920 determines in step S1103 that other branch destination candidates remain, the process advances to step S1101. Even when either YES or NO is determined in step S1103, since the last weak discriminator is reached in that branch destination, it is determined that a target object handled by that branch destination is detected.

2. Selection Processing in Weak Discriminator

The selection processing in a weak discriminator will be described below with reference to the flowchart of FIG. 12. In this flowchart, the same step numbers denote the same steps as in FIG. 5, and a repetitive description thereof will be avoided.

Figure 12:
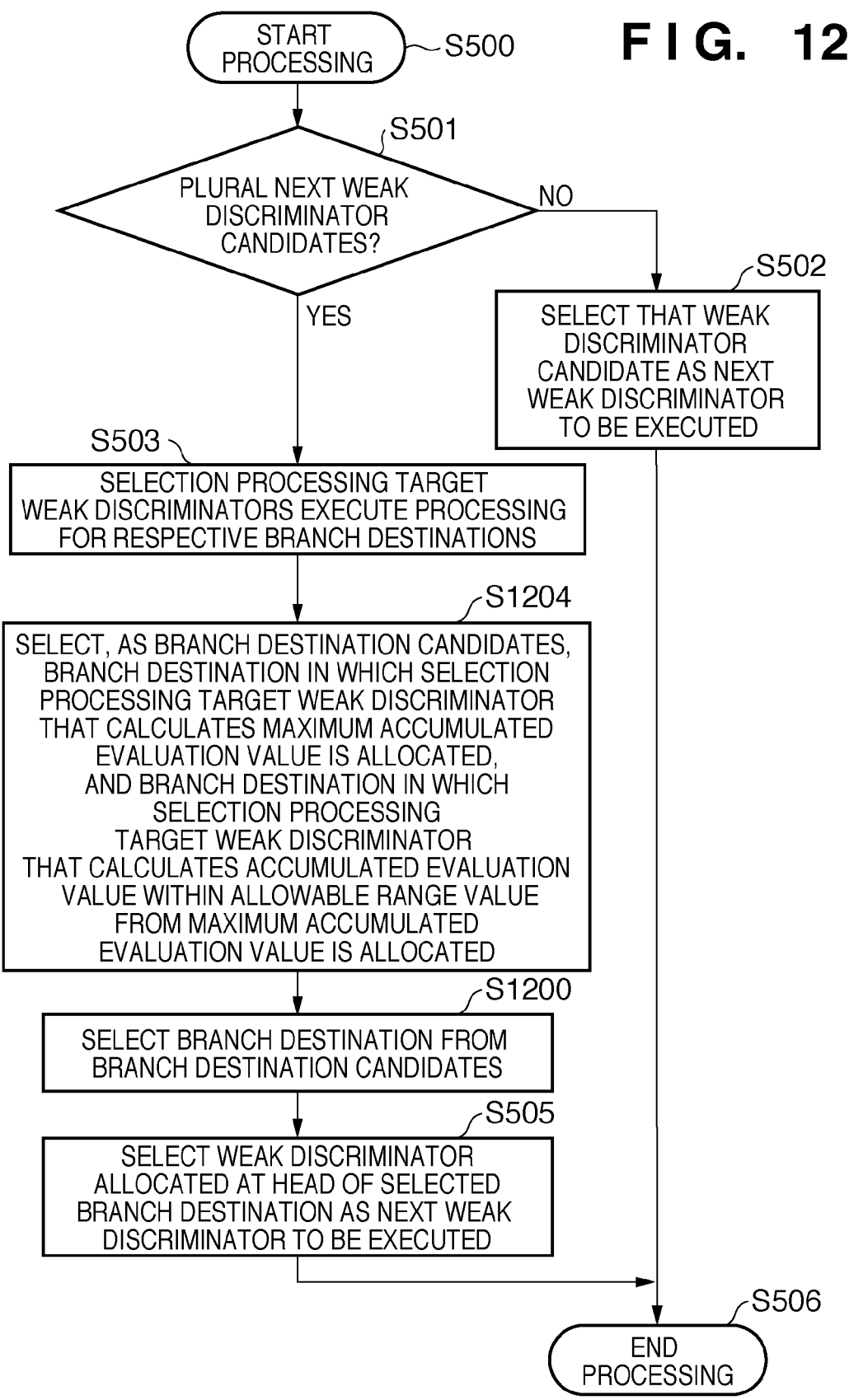
FIG. 12 is a flowchart showing the sequence of selection processing for selecting a next weak discriminator to be executed in the image processing apparatus according to the fifth embodiment of the present invention.

A difference between FIGS. 12 and 5 is the presence/absence of steps S1200 and S1204. As described above, in step S1204 a weak discriminator selects, as branch destination candidates: (1) a branch destination in which a selection processing target weak discriminator which outputs a maximum accumulated evaluation value is allocated; and (2) a branch destination in which a selection processing target weak discriminator which outputs an accumulated evaluation value falling within an allowable value range from the maximum accumulated evaluation value is allocated.

Subsequently, in step S1200 the weak discriminator selects one branch destination from the branch destination candidates. The selection method at this time is not particularly limited. As the allowable value, an appropriate value may be set in advance. In this case, when a large value is set as the allowable value, since the probability of selection of a plurality of branch destination candidates becomes high, the processing time tends to increase. At the same time, since the detection processing is applied to a plurality of branch destinations, improvement of a detection ratio is also expected. Therefore, an appropriate value can be set based on a tradeoff between merits and demerits.

3. Operation Example of Detection Processing Program

The actual execution sequence of the processing of the detection processing program 920 with the module configuration shown in FIG. 9 will be described with reference to FIGS. 10 to 12 using practical examples.

3.1 Operation Example 1

Case without Abort Instruction

As operation example 1, an operation when no abort instruction is output until the last weak discriminator in a branch destination is reached (note that an operation when an abort instruction is output during detection will be described in operation example 2).

When respective pixel values of image data in the processing window 601 are input, the processing of the weak discriminator 900 is executed first (step S302 in FIG. 10). Since the weak discriminator 900 does not output any abort instruction, the detection processing program 920 determines in step S303 that no abort instruction was output, and the process advances to step S304. Since the weak discriminator 900 is not the last weak discriminator, the process advances to step S305 to start the selection processing.

Since only a weak discriminator 901 is allocated as a lower layer of the weak discriminator 900, the weak discriminator 900 determines in step S501 in FIG. 12 that there is not a plurality of next weak discriminator candidates, and the process advances to step S502. Then, the weak discriminator 900 selects the weak discriminator 901 as the next weak discriminator to be executed.

The weak discriminator 901 selected as the next weak discriminator to be executed executes processing for respective pixel values of the image data in the processing window 601. As a result of the progress of processes as in the case of the weak discriminator 900, the weak discriminator 901 selects a weak discriminator 902 as the next weak discriminator to be executed.

The weak discriminator 902 selected as the next weak discriminator to be executed executes processing for respective pixel values of the image data in the processing window 601. As a result of the progress of processes as in the case of the weak discriminator 900, the weak discriminator 902 selects a weak discriminator 903 as the next weak discriminator to be executed.

The weak discriminator 903 selected as the next weak discriminator to be executed executes processing for respective pixel values of the image data in the processing window 601, and the processes progress as in the case of the weak discriminator 900. However, in case of the weak discriminator 903, there are three weak discriminators, that is, weak discriminators 904-A, 904-B, and 904-C as candidates of next weak discriminators to be executed. For this reason, the weak discriminator 903 determines in step S501 in FIG. 12 that there is a plurality of weak discriminator candidates, and the process advances to step S503.

In step S503, selection processing target weak discriminators allocated in the respective branch destinations execute processing. That is, the weak discriminators 904-A, 904-B, and 904-C execute the processing in FIG. 9, and finally calculate accumulated evaluation values.

In step S1204 in FIG. 12, the weak discriminator 903 compares the accumulated evaluation values calculated in step S503. The weak discriminator 903 then specifies a selection processing target weak discriminator which calculates a maximum accumulated evaluation value. At the same time, the weak discriminator 903 specifies a selection processing target weak discriminator which outputs an accumulated evaluation value within an allowable value range from the maximum accumulated evaluation value.

Assume that the weak discriminator 904-B outputs a maximum accumulated evaluation value, and the weak discriminator 904-A outputs an accumulated evaluation value within the allowable value range from the maximum accumulated evaluation value in this case. For this reason, the weak discriminator 903 selects, as branch destination candidates, branch B in which the weak discriminator 904-B is allocated and branch A in which the weak discriminator 904-A is allocated.

In step S1200, the weak discriminator 903 selects one branch destination from the branch destination candidates. Assume that the weak discriminator 903 selects branch B first. In step S505, the weak discriminator 903 selects, as the next weak discriminator to be executed, the weak discriminator 904-B allocated at the head of selected branch B.

Note that the weak discriminator 904-B has already executed the processing in step S302 in FIG. 11 once in the selection processing. Hence, when the processing result (the presence/absence of an abort instruction and accumulated evaluation value) in step S302 executed during the selection processing is stored, the weak discriminator 904-B need not execute the processing again.

Therefore, in step S505 in FIG. 12 the weak discriminator 903 skips the weak discriminator 904-B and selects a weak discriminator 905-B as the next weak discriminator to be executed. Of course, after the weak discriminator 904-B executes processing again, the process may advance to processing of the weak discriminator 905-B.

The same processes as in the case of the weak discriminators 900 to 902 are executed for the weak discriminator 905-B and subsequent weak discriminators, and each weak discriminator selects the next (right neighboring) weak discriminator as the next weak discriminator to be executed.

Note that, in this operation example 1, no abort instruction is output until a last weak discriminator 908-B is reached. For this reason, upon execution of the processing of the weak discriminator 908-B, the detection processing program 920 determines in step S304 that the weak discriminator of interest is the last weak discriminator, and the process advances to step S1103.

The program 920 checks in step S1103 if other branch destination candidates remain. In case of this operation example 1, since branch A remains as another branch destination candidate, the process advances to step S1101. In this case, since the last weak discriminator has been reached in branch B, the program 920 determines that a target object (front-view face) handled by that branch destination is detected.

In step S1101, since the remaining branch destination candidate is only branch A, the program 920 selects branch A. In step S1102, the program 920 selects the weak discriminator 904-A allocated at the head of selected branch A as the next weak discriminator to be executed.

However, in case of this operation example 1, the weak discriminator 904-A has already executed the processing in step S302 in FIG. 11 once during the selection processing. Therefore, when the processing result (the presence/absence of an abort instruction and accumulated evaluation value) in step S302 executed during the selection processing is stored, the processing of the weak discriminator 904-A need not be executed again. Therefore, in step S1102 the program 920 skips the weak discriminator 904-A and selects a weak discriminator 905-A as the next weak discriminator to be executed.

The same processes as in the weak discriminators 905-B to 908-B in branch B are executed for the weak discriminator 905-A and subsequent weak discriminators, and each weak discriminator selects the next (right neighboring) weak discriminator as the next weak discriminator to be executed.

In this operation example 1, no abort instruction is output until the last weak discriminator (weak discriminator 908-A) is reached in branch A. Hence, upon execution of the processing of the weak discriminator 908-A, the program 920 determines in step S304 that the weak discriminator of interest is the last weak discriminator, and the process advances to step S1103.

The program 920 checks in step S1103 if other branch destination candidates remain. In case of operation example 1, since there is no remaining branch destination candidate, the program 920 determines in step S307 that a target object (right-view face) is detected, thus ending the detection processing in the current processing window.

As described above, in operation example 1, both the front- and right-view faces are detected at a predetermined position of the processing window. In general, since a detection processing program has learned to be robust against variations of face views, face sizes, and the like to some extent, one target object may often be detected in a plurality of branch destinations.

In such case, arbitrary integration processing may be executed to integrate a plurality of processing results. At this time, known integration processing may be used. For example, a result obtained by arbitrarily weighting a plurality of branch destinations may be output as a detection result. In this operation example 1, since both the front- and right-view faces are detected, it is determined that an obliquely right-view face from the front direction is detected as an intermediate face between these two faces.

3.2 Operation Example 2

Case with Abort Instruction

As operation example 2, an operation when an abort instruction is output before the last weak discriminator is reached will be explained. For example, an operation when the weak discriminator 905-A outputs an abort instruction will be explained.

The processes in the weak discriminators 900, 901, and 902 are the same as that in the weak discriminator 900 described in operation example 1 above.

After that, the detection processing program 920 selects the weak discriminator 903 as the next weak discriminator to be executed. When the processing of the weak discriminator 903 is executed in step S302, the program 920 selects branches B and A as branch destination candidates. Subsequently, the program 920 selects branch B as a branch destination first from the two branch destination candidates.

The same processes as in the weak discriminators 900 to 902 are executed for the weak discriminator 905-B and subsequent weak discriminators, and each weak discriminator selects the next (right neighboring) weak discriminator as the next weak discriminator to be executed.

In branch B, no abort instruction is output until the last weak discriminator is reached. Hence, upon execution of the processing of the weak discriminator 908-B, the program 920 determines in step S304 that the weak discriminator of interest is the last weak discriminator, and the process advances to step S1103.

The program 920 checks in step S1103 if other branch destination candidates remain. In case of this operation example 2, since branch A remains as another branch destination candidate, the program 920 determines that another branch destination candidate remains, and the process advances to step S1101. At this time, since the last weak discriminator has been reached in branch B, the program 920 determines that a target object (front-view face) handled by that branch destination is detected.

Furthermore, in step S1101, since the remaining branch destination candidate is only branch A, the program 920 selects branch A. In step S1102, the program 920 selects the weak discriminator 904-A allocated at the head of selected branch A as the next weak discriminator to be executed.

However, in case of this operation example 2, the weak discriminator 904-A has already executed the processing once during the selection processing. Therefore, when the processing result (the presence/absence of an abort instruction and accumulated evaluation value) in step S302 executed during the selection processing is stored, the weak discriminator 904-A need not execute the processing again. Therefore, in step S1102 the program 920 skips the weak discriminator 904-A and selects the weak discriminator 905-A as the next weak discriminator to be executed.

Subsequently, assume that as a result of execution of processing in the weak discriminator 905-A, an abort instruction is output in step S406 in FIG. 9. In this case, the program 920 determines in step S303 in FIG. 11 that the abort instruction was issued, and the process advances to step S1100. The program 920 checks in step S1100 if other branch destination candidates remain. In case of operation example 2, since there is no remaining branch destination candidate, the program 920 determines in step S306 that no target object (right-view face) is detected, thus ending the detection processing in the current processing window.

As a result, a plurality of branch destination candidates is selected at a predetermined position of the processing window. However, only a front-view face is finally detected.

As other operation examples, a case in which an abort instruction is issued in branch B, but no abort instruction is issued in branch A, a case in which abort instructions are issued in both branches, and the like may be considered. However, a description of these operation examples is not given, since they are easily estimated from the description of this operation example.

Sixth Embodiment

The first to third embodiments have explained the detection processing with the module configuration shown in FIG. 2, and the fourth and fifth embodiments have explained that of the detection processing program with the module configuration shown in FIG. 9. However, the module configuration of an image processing apparatus according to the present invention is not limited to them. Detection processing with a module configuration different from FIGS. 2 and 9 will be described below.

1. Module Configuration of Detection Processing Program 1320

Figure 13:
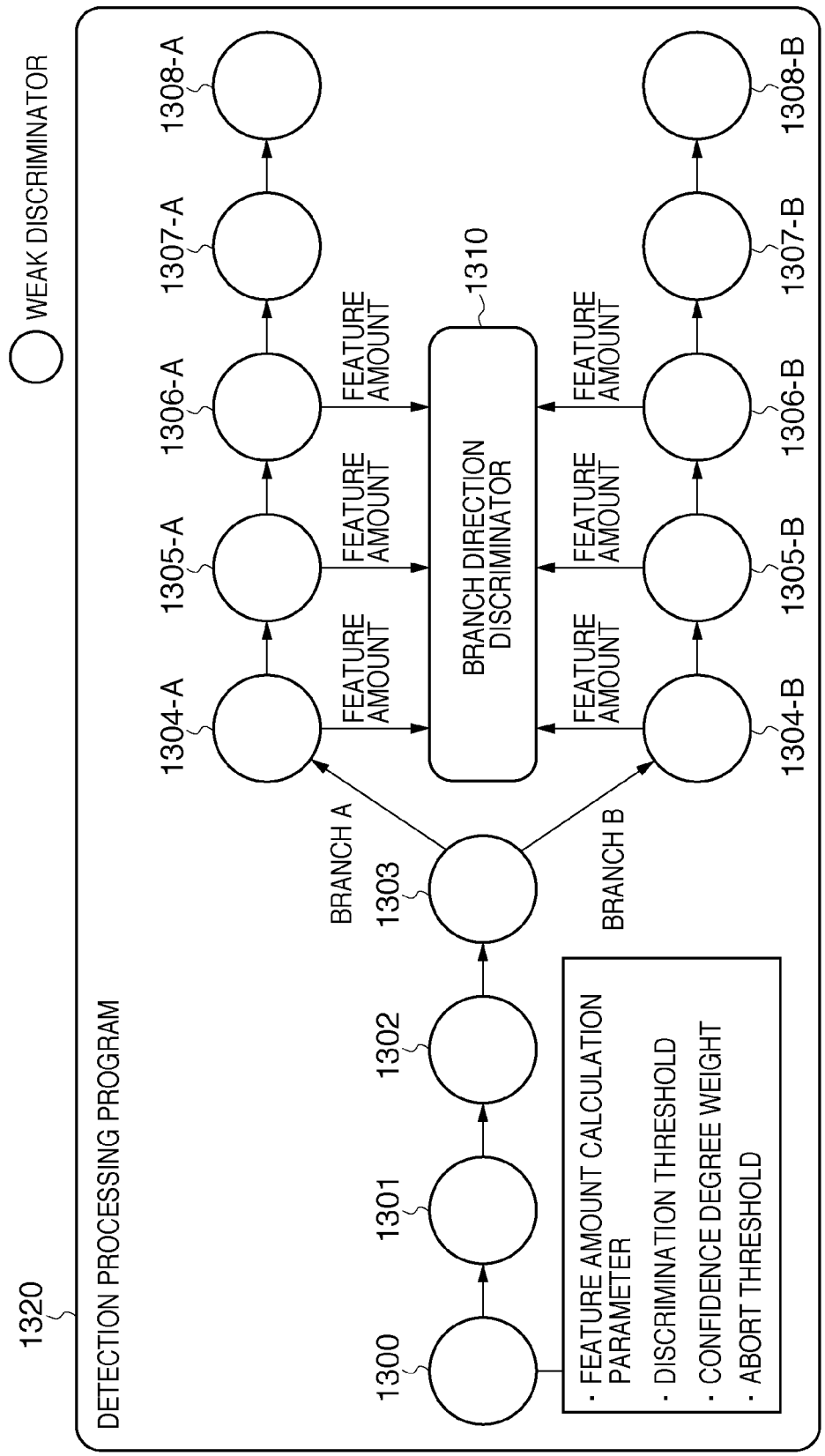
FIG. 13 is a view showing the module configuration of a detection processing program 1320 in an image processing apparatus according to the sixth embodiment of the present invention.

FIG. 13 is a view showing the module configuration of a detection processing program 1320 in an image processing apparatus according to this embodiment, which includes a plurality of weak discriminators 1300 to 1303, 1304-A to 1308A, 1304-B to 1308-B and a branch direction discriminator 1310. As shown in FIG. 13, the detection processing program 1320 executes selection processing based on a branch destination discrimination result output from a branch direction discriminator 1310.

Reference numeral 1310 denotes a branch direction discriminator. The branch direction discriminator 1310 selects a branch destination to have, as inputs, feature amounts calculated by selection processing target weak discriminators 1304-A to 1306A and 1304-B to 1306-B. The branch destination selection processing of the branch direction discriminator 1310 may be executed based on known discrimination processing such as a linear identification method, SVM (Support Vector Machine), and the like. Assume that parameters required for these identification methods are learned and calculated in advance.

In this embodiment, selection processing target weak discriminators of branch A are weak discriminators 1304-A, 1305-A, and 1306-A, and those of branch B are weak discriminators 1304-B, 1305-B, and 1306-B.

The feature amounts calculated upon execution of the processing (FIG. 4) of the weak discriminators 1304-A to 1306A and 1304-B to 1306-B are input to the branch direction discriminator 1310 so as to select a branch destination. Hence, no special values are calculated for the branch direction discriminator 1310.

Therefore, an overhead required to select a branch destination is lighter than a case in which new amounts which are not related to the processing of the weak discriminators are calculated and are input to the branch direction discriminator 1310.

2. Sequence of Processing in Detection Processing Program 1320

The detection processing program 1320 shown in FIG. 13 executes detection processing basically according to the flowchart shown in FIG. 3. However, since the contents of the selection processing in step S305 are different, a difference in the selection processing will be mainly described below with reference to FIG. 14. The same step numbers in FIG. 14 denote the same steps as in FIG. 5, and a repetitive description thereof will be omitted.

Figure 14:
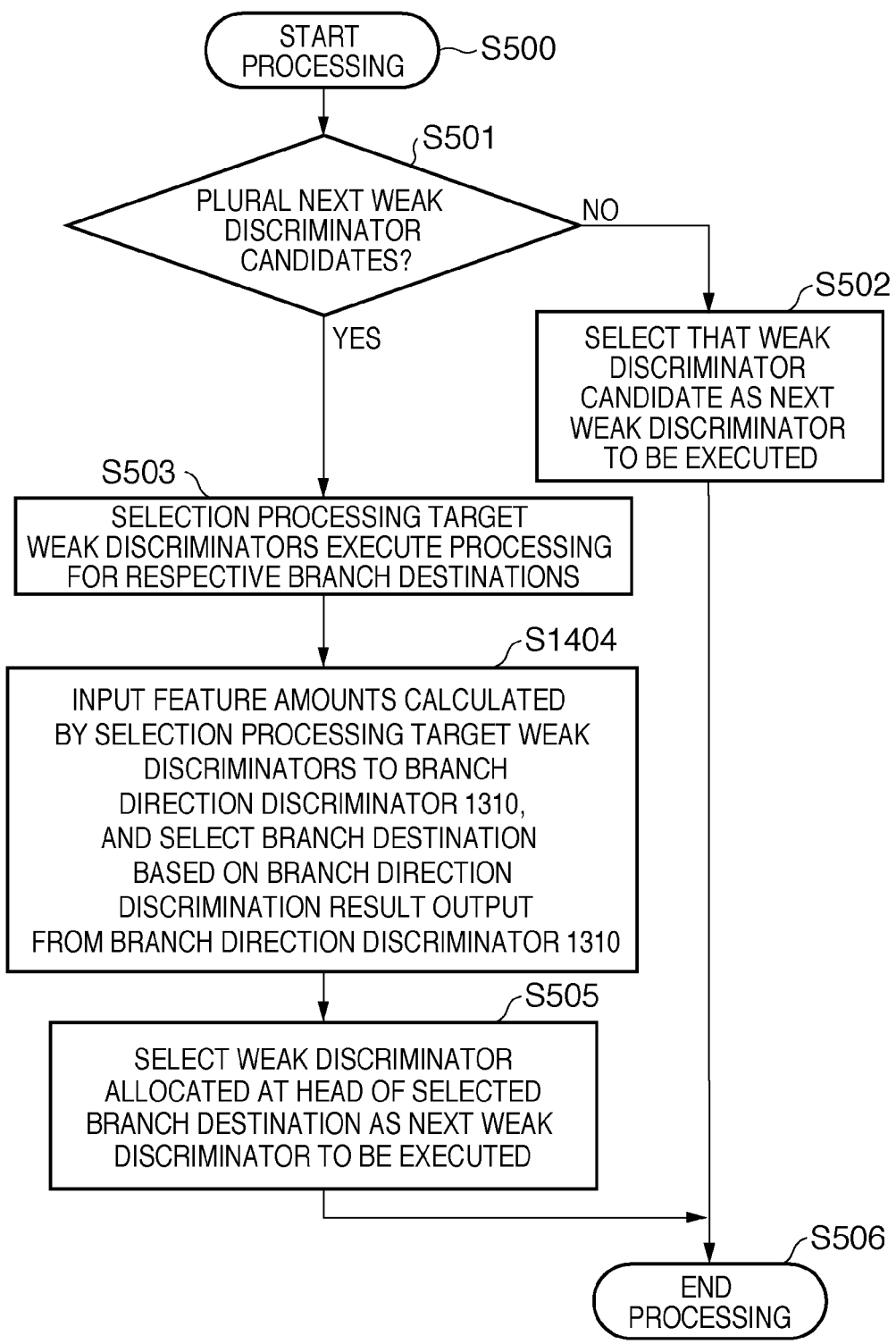
FIG. 14 is a flowchart showing the sequence of selection processing for selecting a next weak discriminator to be executed in the image processing apparatus according to the sixth embodiment of the present invention.

A difference between FIGS. 14 and 5 is the presence/absence of step S1404. As described above, in step S1404 the detection processing program 1320 inputs the feature amounts calculated by the selection processing target weak discriminators 1304-A to 1306A and 1304-B to 1306-B to the branch direction discriminator 1310, and selects a branch destination based on a branch direction discrimination result output from the branch direction discriminator 1310.

Since the practical execution sequence of the processing of the detection processing program 1320 with the module configuration shown in FIG. 13 can be easily estimated from the operation examples described so far and the flowchart of FIG. 14, a description thereof will not be given.

In this embodiment, the feature amounts calculated when the weak discriminators execute the processing shown in FIG. 4 are input to the branch direction discriminator 1310. However, the present invention is not particularly limited to feature amounts. For example, discrimination results, evaluation values, accumulated evaluation values, or their combinations may be input to the branch direction discriminator 1310.

Seventh Embodiment

The above embodiments have explained the case in which the number of branches is 2 or 3 as the module configuration of the detection processing program. However, the number of branches of a detection processing program in an image processing apparatus according to the present invention is not limited to such specific value.

The above embodiments have explained the case in which the module configuration of the detection processing program has only one branch point. However, the branch point of the detection processing program in the image processing apparatus according to the present invention is not limited to one point. The module configuration may have a tree structure in which each branch destination further branches.

AdaBoost has been explained as an example of the learning method of weak discriminators. However, the present invention is not limited to such specific method. Various other methods have been proposed as Boosting methods, and the detection processing program may have a configuration including weak discriminators which have learned using these methods.

Other Embodiments

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a recording medium, which records a program code of software that implements the functions of the aforementioned embodiments to the system or apparatus. In this case, the functions are implemented when a computer (or a CPU or MPU) of the system or apparatus reads out and executes the program code stored in the recording medium. Note that the recording medium that stores the program code constitutes the present invention in such case.

As the recording medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case wherein an OS (operating system) running on a computer may execute some or all of actual processes based on an instruction of the program code to implement the functions of the aforementioned embodiments.

Furthermore, the present invention also includes a case wherein the functions of the aforementioned embodiments are implemented after the program code read out from the recording medium is written in a memory equipped on a function expansion board or unit, which is inserted into or connected to the computer. That is, the present invention includes a case wherein after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-285403 filed on Nov. 1, 2007, which is hereby incorporated by reference herein in its entirety.

What is claimed is:

1. An image processing apparatus which is configured to execute processing by allocating a plurality of weak discriminators to form a tree structure having branches corresponding to types of objects so as to detect objects included in image data, wherein each weak discriminator comprises:
 a calculation unit configured to calculate a feature amount to be used in a calculation of an evaluation value of the image data; and
 a discrimination unit configured to discriminate whether or not an object is included in the image data based on the evaluation value,
 wherein a weak discriminator allocated to a branch point in the tree structure further comprises a selection unit configured to select a branch destination based on accumulated evaluation values which are respectively calculated by accumulating evaluation values for a predetermined number of weak discriminators included in the respective branch destinations.

2. The apparatus according to claim 1, wherein the calculation unit calculates the feature amount by a calculation which is determined in advance for each weak discriminator.

3. The apparatus according to claim 2, wherein the selection unit selects a branch destination in which the number of weak discriminators in each of which the calculated feature amount exceeds a predetermined threshold of the weak discriminators included in each of the respective branch destinations is largest.

4. The apparatus according to claim 1, wherein the calculation unit calculates the evaluation value based on a result of comparison between a threshold which is determined in advance for each weak discriminator and the calculated feature amount, and a degree of confidence which is determined in advance for each weak discriminator.

5. The apparatus according to claim 1, wherein the discrimination unit discriminates whether or not the object is included in the image data based on an accumulated evaluation value calculated by accumulating the evaluation values calculated for respective weak discriminators.

6. The apparatus according to claim 5, wherein the selection unit selects a branch destination which includes a weak discriminator in which the calculated accumulated evaluation value exceeds a predetermined threshold earliest of the weak discriminators included in each of the respective branch destinations.

7. The apparatus according to claim 5, wherein the selection unit selects a branch destination in which the accumulated evaluation value calculated by executing a predetermined number of weak discriminators of the plurality of weak discriminators included in each of the respective branch destinations is largest, and a branch destination in which the accumulated evaluation value falls within a predetermined allowable value range.

8. The apparatus according to claim 5, wherein, when an accumulated evaluation value is less than a predetermined threshold, a weak discriminator allocated in a lower layer than the weak discriminator which calculated the accumulated evaluation value is controlled so that processing of the weak discriminator is aborted.

9. The apparatus according to claim 5, wherein, assuming that the plurality of weak discriminators are configured by a plurality of groups, each including weak discriminators connected in a cascade, when an accumulated evaluation value calculated by a weak discriminator allocated at a rearmost position of each of the plurality of groups is less than a predetermined threshold, a weak discriminator included in a group allocated at a lower layer than a group to which that weak discriminator belongs is controlled so that processing of the weak discriminator is aborted.

10. The apparatus according to claim 1, wherein processing of the weak discriminator is specified by parameters calculated by ensemble learning.

11. An image processing method in an image processing apparatus which executes processing by allocating a plurality of weak discriminators to form a tree structure having branches corresponding to types of objects so as to detect objects included in image data, wherein each weak discriminator performs the image processing method comprising:

calculating a feature amount to be used in a calculation of an evaluation value of the image data; and discriminating whether or not the object is included in the image data based on the evaluation value, wherein the image processing method performed by a weak discriminator allocated to a branch point in the tree structure further comprises selecting a branch destination based on accumulated evaluation values which are respectively calculated by accumulating evaluation values for a predetermined number of weak discriminators included in each of the respective branch destinations.

12. A non-transitory computer readable medium containing computer-executable instructions to be utilized in an image processing apparatus for executing processing by allocating a plurality of weak discriminators to form a tree structure having branches corresponding to types of objects so as to detect objects included in image data, wherein computer-executable instructions performed by each weak discriminator includes:

computer-executable instructions for calculating a feature amount to be used in a calculation of an evaluation value of the image data; and computer-executable instructions for discriminating whether or not the object is included in the image data by using the evaluation value, wherein computer-executable instructions performed by a weak discriminator allocated to a branch point in the tree structure further includes computer-executable instructions for selecting a branch destination based on accumulated evaluation values which are respectively calculated by accumulating evaluation values for a predetermined number of weak discriminators included in the respective branch destinations.

* * * * *